United States Patent
Li

(10) Patent No.: US 7,203,620 B2
(45) Date of Patent: Apr. 10, 2007

(54) SUMMARIZATION OF VIDEO CONTENT

(75) Inventor: Baoxin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1116 days.

(21) Appl. No.: 10/155,358

(22) Filed: May 23, 2002

(65) Prior Publication Data

US 2003/0081937 A1    May 1, 2003

Related U.S. Application Data

(60) Provisional application No. 60/302,911, filed on Jul. 3, 2001.

(51) Int. Cl.
*G06F 11/00* (2006.01)

(52) U.S. Cl. .................. 702/181; 345/461

(58) Field of Classification Search ........... 702/181, 702/182–185; 345/461, 473
See application file for complete search history.

(56) References Cited

U.S. PATENT DOCUMENTS

| | | | |
|---|---|---|---|
| 4,183,056 A | 1/1980 | Evans et al. | |
| 4,253,108 A | 2/1981 | Engel | |
| 4,298,884 A | 11/1981 | Reneau | |
| 4,321,635 A | 3/1982 | Tsuyuguchi | |
| 4,520,404 A | 5/1985 | Von Kohorn | |
| 4,729,044 A | 3/1988 | Kiesel | |
| 4,937,685 A | 6/1990 | Barker et al. | |
| 5,027,400 A | 6/1991 | Baji et al. | |
| 5,101,364 A | 3/1992 | Davenport et al. | |
| 5,109,482 A | 4/1992 | Bohrman | |
| 5,148,154 A | 9/1992 | MacKay et al. | |
| 5,200,825 A | 4/1993 | Perine | |
| D348,251 S | 6/1994 | Hendricks | |
| 5,333,091 A | 7/1994 | Iggulden et al. | |
| 5,339,393 A | 8/1994 | Duffy et al. | |
| D354,059 S | 1/1995 | Hendricks | |
| 5,424,770 A | 6/1995 | Schmelzer et al. | |
| 5,434,678 A | 7/1995 | Abecassis | |
| 5,452,016 A | 9/1995 | Ohara et al. | |
| D368,263 S | 3/1996 | Hendricks | |
| 5,521,841 A | 5/1996 | Arman et al. | |
| 5,559,549 A | 9/1996 | Hendricks et al. | |
| 5,589,945 A | 12/1996 | Abecassis | |
| 5,600,364 A | 2/1997 | Hendricks et al. | |
| 5,600,573 A | 2/1997 | Hendricks et al. | |
| 5,610,653 A | 3/1997 | Abecassis | |
| 5,634,849 A | 6/1997 | Abecassis | |

(Continued)

FOREIGN PATENT DOCUMENTS

JP    11-032267    2/1999

(Continued)

OTHER PUBLICATIONS

Boreczky, John S. and Wilcox, Lynn D., "A Hidden Markov Model Framework for Video Segmentation Using Audio and Image Features," FX Palo Alto Laboratory, Palo Alto, California, USA, date unknown.

(Continued)

*Primary Examiner*—Edward Raymond
(74) *Attorney, Agent, or Firm*—Chernoff, Vilhauer, McClung & Stenzel

(57) ABSTRACT

Summarization of video content including sports.

53 Claims, 12 Drawing Sheets

U.S. PATENT DOCUMENTS

| | | |
|---|---|---|
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Muedin et al. |
| 5,675,752 A | 10/1997 | Scott et al. |
| 5,682,195 A | 10/1997 | Hendricks et al. |
| 5,684,918 A | 11/1997 | Abecassis |
| 5,696,869 A | 12/1997 | Abecassis |
| 5,710,884 A | 1/1998 | Dedrick |
| 5,717,814 A | 2/1998 | Abecassis |
| 5,724,472 A | 3/1998 | Abecassis |
| 5,734,853 A | 3/1998 | Hendricks et al. |
| 5,761,881 A | 6/1998 | Wall |
| 5,774,357 A | 6/1998 | Hoffberg et al. |
| 5,778,108 A | 7/1998 | Coleman, Jr. |
| 5,797,001 A | 8/1998 | Augenbraun et al. |
| 5,798,785 A | 8/1998 | Hendricks |
| 5,805,733 A | 9/1998 | Wang et al. |
| 5,821,945 A | 10/1998 | Yeo et al. |
| D402,310 S | 12/1998 | Hendricks |
| 5,861,881 A | 1/1999 | Freeman et al. |
| 5,867,386 A | 2/1999 | Hoffberg et al. |
| 5,875,107 A | 2/1999 | Hoffberg et al. |
| 5,875,108 A | 2/1999 | Hoffberg et al. |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,913,013 A | 6/1999 | Abecassis |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,933,811 A | 8/1999 | Angles et al. |
| 5,956,026 A | 9/1999 | Ratakonda |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,095 A | 11/1999 | Ratakonda |
| 6,002,833 A | 12/1999 | Abecassis |
| 6,011,895 A | 1/2000 | Abecassis |
| 6,014,183 A | 1/2000 | Hoang |
| 6,038,367 A | 3/2000 | Abecassis |
| 6,052,554 A | 4/2000 | Hendricks et al. |
| 6,055,018 A | 4/2000 | Swan |
| 6,067,401 A | 5/2000 | Abecassis |
| 6,072,934 A | 6/2000 | Abecassis |
| 6,081,750 A | 6/2000 | Hoffberg et al. |
| 6,088,455 A | 7/2000 | Logan et al. |
| 6,091,886 A | 7/2000 | Abecassis |
| RE36,801 E | 8/2000 | Logan et al. |
| 6,100,941 A | 8/2000 | Dimitrova et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,160,989 A | 12/2000 | Hendricks et al. |
| 6,161,142 A | 12/2000 | Wolfe et al. |
| 6,169,542 B1 | 1/2001 | Hooks et al. |
| 6,181,335 B1 | 1/2001 | Hendricks et al. |
| 6,195,497 B1 | 2/2001 | Nagasaka et al. |
| 6,201,536 B1 | 3/2001 | Hendricks et al. |
| 6,208,805 B1 | 3/2001 | Abecassis |
| 6,215,526 B1 | 4/2001 | Barton et al. |
| 6,216,129 B1 | 4/2001 | Eldering |
| 6,219,837 B1 | 4/2001 | Yeo et al. |
| 6,230,501 B1 | 5/2001 | Bailey, Sr. et al. |
| 6,233,389 B1 | 5/2001 | Barton et al. |
| 6,236,395 B1 | 5/2001 | Sezan et al. |
| 6,252,544 B1 | 6/2001 | Hoffberg |
| 6,269,216 B1 | 7/2001 | Abecassis |
| 6,275,268 B1 | 8/2001 | Ellis et al. |
| 6,289,165 B1 | 9/2001 | Abecassis |
| 6,304,665 B1 | 10/2001 | Cavallaro et al. |
| 6,304,715 B1 | 10/2001 | Abecassis |
| 6,342,904 B1 | 1/2002 | Vasudevan et al. |
| 6,363,160 B1 | 3/2002 | Bradski et al. |
| 6,418,168 B1 | 7/2002 | Narita |
| 6,549,643 B1 | 4/2003 | Toklu et al. |
| 6,556,767 B2 | 4/2003 | Okayama et al. |
| 6,597,859 B1 | 7/2003 | Leinhart et al. |
| 6,665,423 B1 | 12/2003 | Mehrotra et al. |
| 6,678,635 B2 | 1/2004 | Torinkere et al. |
| 6,691,126 B1 | 2/2004 | Syeda-Mahmood |
| 6,724,933 B1 | 4/2004 | Lin et al. |
| 6,774,917 B1 | 8/2004 | Foote et al. |
| 6,829,781 B1 | 12/2004 | Bhagavath et al. |
| 6,931,595 B2 | 8/2005 | Pan et al. |
| 6,970,510 B1 | 11/2005 | Wee et al. |
| 6,981,129 B1 | 12/2005 | Boggs et al. |
| 6,993,245 B1 | 1/2006 | Harville |
| 2002/0013943 A1 | 1/2002 | Haberman et al. |
| 2002/0018594 A1 | 2/2002 | Xu et al. |
| 2002/0080162 A1 | 6/2002 | Pan et al. |
| 2002/0083473 A1 | 6/2002 | Agnihotri et al. |
| 2002/0120929 A1 | 8/2002 | Schwalb et al. |
| 2002/0141619 A1 | 10/2002 | Standridge et al. |
| 2002/0184220 A1 | 12/2002 | Teraguchi et al. |
| 2002/0194589 A1 | 12/2002 | Cristofalo et al. |
| 2003/0001880 A1 | 1/2003 | Holtz et al. |
| 2003/0026592 A1 | 2/2003 | Kawhara et al. |
| 2003/0081937 A1 | 5/2003 | Li |
| 2004/0017389 A1 | 1/2004 | Pan et al. |
| 2004/0088289 A1 | 5/2004 | Xu et al. |
| 2004/0125124 A1 | 7/2004 | Kim et al. |
| 2004/0125877 A1 | 7/2004 | Chang et al. |
| 2004/0227768 A1 | 11/2004 | Bates et al. |

FOREIGN PATENT DOCUMENTS

| | | |
|---|---|---|
| JP | 11-261908 | 9/1999 |
| JP | 2000-013755 | 1/2000 |
| WO | WO 99/65237 | 12/1999 |

OTHER PUBLICATIONS

Drew D. Saur, Yap-Peng Tan, Sanjeev R. Kulkarni, and Peter J. Ramadge, "Automated Analysis and Annotation of Basketball Video," SPIE vol. 3022, pp. 176-187.

Selim Aksoy and Robert M. Haralick, "Textural Features for Image Database Retrieval," Intelligent Systems Laboratory, Department of Electrical Engineering, University of Washington, Seattle.

Giridharan Iyengar and Andrew Lippman, "Models for automatic classification of video sequences," SPIE vol. 3312, pp. 216-227.

Hongjiang Zhang, Stephen W. Smollar and Jian Hua Wu, "Content-Based Video Browsing Tools," SPIE vol. 2417, pp. 389-398.

Bilge Gunsel, Yue Fu and A. Murat Tekalp, "Hierarchical Temporal Video Segmentation and Content Characterization," SPIE vol. 3229, pp. 46-56.

Sunghoon Choi, Yongduek Seo, Hyunwoo Kim, and Ki-Sang Hong, "Where are the ball and players?: Soccer Game Analysis with Color-based Tracking and Image Mosaick," Dept. of EE, Pohang University of Science and Technology, Republic of Korea, pp. 1-15.

Vikrant Kobla, Daniel DeMenthon, and David Doermann, "Identifying Sports Videos Using Replay, Text, and Camera Motion Features," University of Maryland, Laboratory for Language and Media Processing; at least one year prior to filing date; 12 pages.

Richard W. Conners and Charles A. Harlow, "A Theoretical Comparison of Texture Algorithms," IEEE Transactions on Pattern Analysis and Machine Intelligence, vol. PAMI-2, No. 3, May 1980, pp. 204-222.

S. E. Levinson, L. R. Rabiner, and M. M. Sondhi, "An Introduction to the Application of the Theory of Probabilistic Functions of a Markov Process to Automatic Speech Recognition," American Telephone and Telegraph Company, The Bell System Technical Journal, vol. 62, No. 4, Apr. 1983, pp. 1035-1074.

John Canny, "A Computational approach to Edge Detection," IEEE Transactions on Pattern Analysis and Machine Intelligence, vol. PAMI-8, No. 6, Nov. 1986, pp. 679-698.

Lawrence R. Rabiner, "A Tutorial on Hidden Markov Models and Selected Applications in Speech Recognition," Proceedings of the IEEE, vol. 77, No. 2, Feb. 1989, pp. 257-286.

B. B. Chaudhuri, N. Sarkar, and P. Kundu, "Improved Fractal Geometry Based Texture Segmentation Technique," IEEE Proceedings-E, vol. 140, No. 5, Sep. 1993, pp. 233-241.

Alberto Del Bimbo, Enrico Vicario and Daniele Zingoni, "A Spatial Logic for Symbolic Description of Image Contents," Journal of Visual Languages and Computing (1994) 5, pp. 267-286.

Zhang Stephen W. Smoliar and Hongjiang, "Content-Based Video Indexing and Retrieval," IEEE 1994, pp. 62-72.

F. Arman, R. Depommier, A. Hsu, and M-Y. Chiu, "Content-based Browsing of Video Sequences," Proceedings of ACM International Conference on Multimedia '94, Oct. 15-20, San Francisco, CA, USA.

Stephen S. Intille and Aaron F. Bobick, "Visual Tracking Using Closed-Worlds," M.I.T. Media Laboratory Perceptual computing Section Technical Report No. 294, Nov. 1994, pp. 1-18.

Stephen S. Intille, "Tracking Using a Local Closed-World Assumption: Tracking in the Football Domain," M.I.T. Media Lab Perceptual Computing Group Technical Report No. 296, pp. 1-62, Submitted to the Program in Media Arts and Sciences, School of Architecture and Planning on Aug. 5, 1994.

Boon-Lock Yeo and Bede Liu, "On The Extraction Of DC Sequence From MPEG Compressed Video," IEEE 1995, pp. 260-263.

Yihong Gong, Lim Teck Sin, Chua Hock Chuan, Hongjiang Zhang, Masao Sakauchi, "Automatic Parsing of TV Soccer Programs," IEEE 1995, pp. 167-174.

Dennis Yow, Boon-Lock Yeo, Minerva Yeung and Bede Liu, "Analysis and Presentation of Soccer Highlights From Digital Video," Proceedings, Second Asian Conference on Computer Vision (ACCV '95).

Michael A. Smith and Takeo Kanade, "Video Skimming for Quick Browsing based on Audio and Image characterization," Jul. 30, 1995, Carnegie Mellon University, School of Computer Science, Pittsburgh, PA.

Nevenka Dimitrova and Forousan Golshani, "Motion Recovery for video Content Classification," ACM Transactions on Information Systems, vol. 13, No. 4, Oct. 1995, pp. 408-139.

R. W. Picard, "A Society of Models for Video and Image Libraries," IBM Systems Journal, vol. 35, Nos. 3&4, 1996, pp. 292-312.

B.S. Manjunath and W.Y. Ma, "Texture Features for Browsing and Retrieval of Image Data," IEEE Transactions on Pattern Analysis and Machine Intelligence, vol. 18, No. 8, Aug. 1996, pp. 837-842.

Shin'ichi Satoh and Takeo Kanade, "Name-It: Association of Face and Name in Video,", School of Computer Science Carnegie Mellon University, Pittsburgh, PA, Dec. 20, 1996, pp. 1-17.

Minerva Yeung, Boon-Lock Yeo, and Bede Liu, "Extracting Story Units from Long Programs for Video Browsing and Navigation," IEEE 1996, pp. 296-305.

Wayne Wolf, "Hidden Markov Model Parsing of Video Programs," Proceedings of the 1997 IEEE International Conference on Acoustics, Speech, and Signal Processing, 1997, pp. 2609-2611.

Jonathan D. Courtney, "Automatic Video Indexing via Object Motion Analysis," Pattern Recognition, vol. 30, No. 4, pp. 607-625, 1997.

Minerva M. Yeung, "Video Visualization for Compact Presentation and Fast Browsing of Pictorial Content," IEEE Transactions on Circuits and Systems for Video Technology, vol. 7, No. 5, Oct. 1997, pp. 771-785.

Rainer Lienhart, Silvia Pfeiffer, and Wolfgang Effelsberg, "Video Abstracting," Communications of the ACM, vol. 40, No. 12, Dec. 1997, pp. 55-62.

Boon-Lock Yeo and Minerva M. Yeung, "Retrieving and Visualizing Video," Communications of the ACM, Dec. 1997, vol. 40, No. 12, pp. 43-52.

Mark T. Maybury and Andrew E. Merlino, "Multimedia Summaries of Broadcast News," IEEE 1997, pp. 442-449.

Michael T. Chan, You Zhang and Thomas S. Huang, "Real-Time Lip Tracking and Bimodal Continuous Speech Recognition," 1998.

T. Lambrou, P. Kudumakis, R. Speller, M. Sandler, and A. Linney, "Classification of Audio Signals Using Statistical Features on Time and Wavelet Transform Domains," IEEE 1998, pp. 3621-3624.

Padhraic Smyth, "Belief Networks, Hidden Markov Models, and Markov Random Fields: a Unifying View," Information and Computer Science Department, University of California, Irvine, CA, Mar. 20, 1998, pp. 1-11.

Richard J. Qian, M. Ibrahim Sezan, and Kristine E. Matthews, "A Robust Real-Time Face Tracking Algorithm," IEEE 1998, pp. 131-135.

Dulca Ponceleon, Savitha Srinivasan, Arnon Amir, Dragutin Petkovic, and Dan Diklic, "Key to Effective Video Retrieval: Effective Cataloging and Browsing," ACM, Aug. 1998, pp. 99-107.

Daniel DeMenthon, Vikrant Kobla and David Doermann, "Video Summarization by Curve Simplification," ACM 1998, pp. 211-218.

Nuno Vasconcelos and Andrew Lippman, "Bayesian Modeling of Video Editing and Structure: Semantic Features for Video Summarization and Browsing," IEEE 1998, pp. 153-157.

Toshio Kawashima, Kouichi Tateyama, Toshimasa Iijma, and Yoshinao Aoki, "Indexing of Baseball Telecast for Content-based Video Retrieval," IEEE 1998, pp. 871-874.

M. R. Naphade, R.Mehrotra, A. M. Ferman, J. Warnick, T. S. Huang, A. M. Tekalp, "A High-Performance Shot Boundary Detection Algorithm Using Multiple Cues," Proceedings of IEEE International Conference on Image Processing, Chicago, IL, 1998, pp. 884-887.

Richard Qian, Niels Haering, and Ibrahim Sezan, "A Computational Approach to Semantic Event Detection," IEEE 1999, pp. 200-206.

Zhu Liu and Qulan Huang, "Detecting News Reporting Using Audio/Visual Information," IEEE 1999, pp. 324-328.

Vikrant Kobla, Daniel DeMenthon, and David Doermann, "Detection of Slow-Motion Replay Sequences for Indentifying Sports Videos," IEEE Conference, 1999, pp. 135-140.

Rainer Lienhart, "Comparison of Automatic Shot Boundary Detection Algorithms," Part of the IS&T/SPIE Conference on Storage and Retrieval for Image and Video Databases VII, San Jose, California, Jan. 1999, SPIE vol. 3656.

H.B. Lu, Y.J. Zhang, Y.R. Yao, "Robust Gradual Scene Change Detection," Proceedings of IEEE International Conference on Image Processing, Kobe, Japan, 1999.

Stuart Golin, "New Metric to Detect Wipes and Other Gradual Transitions in . . . ," Part of the IS&T/SPIE Conference on Video Communications and Image Processing '99, San Jose, California, Jan. 1999, SPIE vol. 3653, pp. 1464-1474.

Stefan Eickeler and Stefan Muller, "Content-Based Video Indexing of TV Broadcast News Using Hidden Markov Models," Proceedings of IEEE International Conference on Acoustics, speech, and Signal Processing, Phoenix, AZ 1999.

Noboru Babaguchi, "Towards Abstracting sports Video by Highlights," IEEE 2000, pp. 1519-1522.

Ullas Gargi, Rangachar Kasturi, and Susan H. Strayer, "Performance Characterization of Video-Shot-Change Detection Methods," IEEE Transactions on Circuits and Systems for Video Technology, vol. 10, No. 1, Feb. 2000, pp. 1-13.

Yao Wang, Zhu Liu, and Jin-Cheng Huang, "Multimedia Content Analysis," IEEE Signal Processing Magazine, Nov. 2000, pp. 12-35.

Yong Rui, Anoop Gupta, and Alex Acero, "Automatically Extracting Highlights for TV Baseball Programs," ACM Multimedia 2000, Los Angeles, CA, USA, pp. 105-115.

Noboru Babguchi, Yoshihiko Kawai, Yukinobu Yasugi, and Tadahiro Kitahashi, "Linking Live and Replay Scenes in Broadcasted Sports Video," Proceedings of ACM Multimedia 2000 Workshop on Multimedia Information Retrieval (MIR2000), pp. 205-208, Nov. 2000.

Chung-Lin Huang and Chih-Yu Chang, "Video Summarization using Hidden Markov Model," IEEE 2001, pp. 473-478.

H. Pan, P. van Beek, and M. I. Sezan, "Detection of Slow-Motion Replay Segments in Sports Video for Highlights Generation," Proceedings of IEEE International Conference on Acoustics, Speech, and Signal Processing, Salt Lake city, UT, 2001.

Frank R. Kschischang, Brendan J. Frey, and Hans-Andrea Loeliger, "Factor Graphs and the Sum-Product Algorithm," IEEE Transactions on Information Theory, vol. 47, No. 2, Feb. 2001, pp. 498-518.

Peng Xu, Chih-Fu Chang, Ajay Divakaran, Anthony Vetro, and Huifang Sun, "Algorithms and System for High-Level Structure Analysis and Event Detection in Soccer Video," Columbia University, ADVENT—Technical Report #111, Jun. 2001.

Baoxin Li and M. Ibrahim Sezan, "Event Detection and Summarization in sports Video," to be presented in IEEE Workshop on Content-Based Access of Image and Video Libraries (Joint with CUPR), Kauai, Hawaii, Dec. 2001.

Kawai, et al., "Detection of Replay in Broadcast Sports Video by Focusing and Digital Video Effects," IEICE (D-II), vol. J84-DII, No. 2, pp. 432-435, Feb. 2001, (in Japanese).

Hao Pan, Baoxin Li, and M. Ibrahim Sezan, "Automatic Detection of Replay Segments in Broadcast Sports Programs by Detection of Logos in Scene Transitions," IEEE ICASSP 2002, pp. 3385-3388.

Lexing Xie and Shih-Fu Chang, "Structure Analysis of Soccer Video with Hidden Markov Models," ICASSP, 2002.

Riccardo Leonardi and Perangelo Migliorati, "Semantic Indexing of Multimedia Documents," IEEE 2002 (Apr.-Jun. 2002), pp. 44-51.

Y. Kawai, et al., "Detection of Replay Scenes in Broadcasted Sports Video by Focusing on Digital Video Effects," IEICE (D-II), vol. J84-D-II, No. 2, pp. 432-435, Feb. 2001 (in Japanese).

Richard O. Duda and Peter E. Hart, "Use of the Hough Transformation To Detect Lines and Curves in Pictures," Stanford Research Insitute, Menlo Park, California, 1972, Association for Computing Machinery, Inc., pp. 11-15.

www.pvi.com, at least one year prior to filing.

Lexing Xie, "Segmentation and Event Detection in Soccer Audio," EE 6820 Project Soccer Audio, May 15, 2001, pp. 1-9.

Alan E. Bell, "The dynamic digital disk," IEEE Spectrum, Oct. 1999, pp. 28-35.

International Organization for Standardization ISO/IEC JTC1/SC29/WG11/N3399, Coding of Moving Pictures and Associated Audio, "Visual Working Draft 3.0," Jun. 2000, Geneva.

International Organisation for Standardisation, ISO/IEC JTC1/SC29/WG11/N3398, Coding of Moving Pictures and Associated Audio Information, "MPEG-7 Visual Part of eXperimentation Model Version 6.0," Jun. 2000, Geneva.

International Organization for Standardization, ISO/IEC JTC 1/SC 29/WG 11/N3410, Coding of Moving Pictures and Audio, MPEG-7 Multimedia Description Schemes XM (Version 3.0), May 2000, Geneva.

International Organization for Standardization ISO/IEC JTC 1/SC 29/WG 11/N3411, Coding of Moving Pictures and Audio, MPEG-7 Multimedia Description Schemes WD (Version 3.0), May 2000, Geneva.

International Organization for Standardization, ISO/IEC JTC1/SC29/WG11/N3391, Coding of Moving Pictures and Associated Audio, "DDL Working Draft 3.0," May 2000., Geneva.

International Organisation for Standardisation, ISO/IEC JTC1/SC29/WG11/N2844, Coding of Moving Pictures and Audio Information, "MPEG-7 Description Schemes (V0.5)," Jul. 1999, Vancouver.

International Organisation for Standardisation, ISO/IEC JTC1/SC29/WG11/MXXXX, MPEG-7 Media/Meta DSs upgrade (V02.), Oct. 1999, Melbourne.

ISO/IEC JTC 1/SC 29 N3705, "Information Technology—Multimedia Content Description Interface—Part 5: Multimedia Description Schemes," Nov. 17, 2000.

International Organization for Standardization, ISO/IEC JTC 1/SC 29/WG 11/N3966, Information technology—Multimedia Content Description Interface—part 5: Multimedia Description Schemes, Mar. 12, 2001.

"XML Schema Part 1: Structures," W3C Working Draft, May 6, 1999, pp. 1-60.

"XML Schema Part 2: Datatypes," World Wide Web Consortium Working Draft, May 6, 1999, pp. 1-37.

"A Schema for TV-anytime: Segmentation Metadata AN195," NDS Contribution from MyTV, Copyright NDS Limited 2000, pp. 1-27.

"A Schema for TV-Anytime Segmentation Metadata AN195r1," myTV project, Copyright NDS Limited 2000, pp. 1-28.

Christel, Michael G., Hauptmann, Alexander G. Warmack, Adrienne S., and Crosby, Scott S., "Adjustable Filmstrips and Skims as Abstractions for a Digital video Library," Computer Science Department, Carnegie Mellon University, Pittsburgh, PA; pp. 1-7.

Masumitse, Ken and Echigo, Tomio, Video summarization Using Reinforcement Learning in Eigenspace; IBM Research, Tokyo Research Laboratory 1623-14, Shimotsuruma, Yamatoshi, Kanagawa, Japan.

Eickler, Stefan, et al., Content-Based Video Indexing of TV Broadcast News Using Hidden markov Models, IEEE International conference on Acoustics, Speech and Signal Processing, Phoenix, AZ, 1999, consisting of four pages.

Pan, H., et al. "Detection of Slow-Motion Replay Segments In Sports Video for Highlights Generation," IEEE International Conference on Acoustics, Speech and signal Processing, Salt Lake City, UT 2001, consisting of four pages.

Boreczky, John S., et al., A Hidden Markov Model Framework for video Segmentation Using Audio and Image Features, IEEE International conference on Acoustics, Speech and Signal Processing, Seattle, WA 1998, consisting of four pages.

SUMMARIZATION OF VIDEO CONTENT

"This application claims the benefit of U.S. patent application Ser. No. 60/302,911 filed on Jul. 3, 2001".

BACKGROUND OF THE INVENTION

The present invention relates to summarization of video content.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

What is desired, therefore, is a video summarization technique suitable for video.

DETAILED DESCRIPTION OF THE PREFERRED EMBODIMENT

Sumo Wrestling

Figure 1:
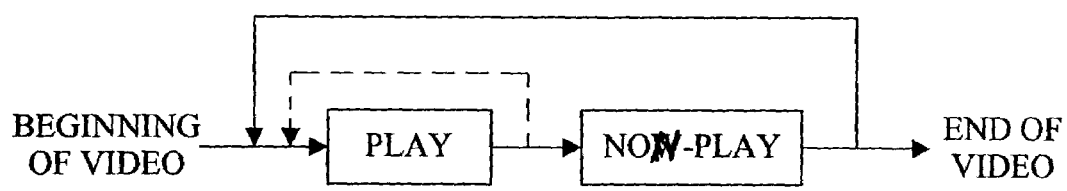
FIG. 1 is an exemplary flowchart for play and non-play detection.

Sumo, the national sport of Japan, is tremendously popular in eastern Asia and is growing in popularity elsewhere in the world. Sumo is a sport comprising bouts in which two contestants meet in a circular ring 4.55 meters in diameter. The rules of Sumo are uncomplicated. After the contestants and a referee have entered the circular ring, the bout begins with an initial charge—called a "tachiai"—where each contestant rushes towards, then collides with, the other. The bout will end when one of the contestant loses by either stepping outside the circular ring or touching the ground with any part of the contestant's body other than the soles of the feet. Aside from a limited number of illegal moves, such as gouging the opponent's eyes, striking with a closed fist, or intentionally pulling at the opponent's hair, there are no rules that govern a sumo bout.

Sumo participants may compete against each another in one of a number of tournaments. Japan sponsors six sanctioned Grand Sumo tournaments, held in odd-numbered months throughout the year, in which competitive sumo contestants face one another with the opportunity for advancement in rank. Sumo contestants are ranked under a strict meritocracy; winning bouts in these sanctioned tournaments improves a competitor's rank while losing bouts diminishes that rank. Aside from the six sanctioned tournaments, a number of exhibition tournaments—called Jungyo—are scheduled throughout the year. Though a sumo tournament will typically take place over several weeks with bouts scheduled throughout each day, most bouts of interest, i.e. those involving higher ranked contestants, are scheduled to begin late afternoon when live television broadcasts of the tournament occur. These portions of the sumo tournaments usually last 2–3 hours each day and are often video recorded for later distribution or for re-broadcast.

Though such a video of a sumo tournament might typically last about 2–3 hours, only about ten minutes turns out to include time during which two players are in a bout. An individual sumo bout is brief; the typical bout will end with the initial collision, though a rare bout might last two to three minutes. Interspersed between bouts are a large number of ceremonies that precede and follow each bout.

Though brief, the time intervals during which a bout is proceeding are intense and can captivate those in the viewing audience, many of whom are able to identify a myriad of named sumo techniques that may occur in rapid succession. Such techniques include a "kekaeshi" (a foot-sweep), a "kubinage" (a head-lock throw), and an "izori" (a technique where a contestant crouches below the opponent's rush, grabbing one of the opponent's legs, lifting the opponent upon the shoulders and falling backwards), as well as some sixty five to seventy more named sumo techniques or occurrences.

The remaining time during the sumo tournament is typically not exciting to watch on video. Such time would include for example inter-bout changes of players, pre-bout exercises and ceremonies, post-bout ceremonies and in the case of broadcast, nearly endless commercials. While it may indeed be entertaining to sit in an arena for several hours for a sumo tournament, many people who watch a video of a sumo tournament find it difficult to watch all of the tournament, even if they are rabid fans. Further, the tournaments are held during daytime hours, hence many fans are unable to attend a tournament or to watch a live broadcast due to work. Such fans may nonetheless be interested in watching specific bouts or some other condensed version of the tournament. Thus a video summarization of the sumo tournament that provides a summary of the tournament having a duration shorter than the original sumo video, may be appealing to many people. The video summarization should provide nearly the same level of the excitement (e.g. interest) that the original game provided.

Upon initial consideration, sumo would not be a suitable candidate to attempt automated video summarization. Initially, there are nearly an endless number of potential moves that may occur that would need to be accounted for in some manner. In addition, each of these moves may involve significant player motion that is difficult to anticipate, difficult to track, and is not consistent between plays. In addition, the players are flesh toned and the ring is likewise generally flesh toned making identification of the events difficult. Based upon such considerations it has been previously considered impractical, if not impossible, to attempt to summarize sumo.

It is conceivably possible to develop highly sophisticated models of a typical sumo video to identify potentially relevant portions of the video. However, such highly sophisticated models are difficult to create and are not normally robust. Further, the likelihood that a majority of the highly relevant portions of the sumo video will be included in such a video summarization is low because of the selectivity of the model. Thus the resulting video summarization of the sumo tournament may simply be unsatisfactory to the average viewer.

Baseball

A typical baseball game lasts about 3 hours of which only about one hour turns out to include time during which the ball is in action. The time during which the ball is in action is normally the exciting part of the game, such as for example, pitching the ball to the batter, hitting a home run, hitting the ball, running the bases, a pitch to first base, pitching a "foul" ball, pitching a "strike" ball, pitching a "ball", fouling the ball to the bleachers, catching a pop fly, etc. The remaining time during the baseball game is typically not exciting to watch on video, such as for example, nearly endless commercials, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to sit in a stadium for three hours for a one hour baseball game, many people who watch a video of a baseball game find it difficult to watch all of the game, even if they are loyal fans. A video summarization of the baseball video, which provides a summary of the game having a duration shorter than the original baseball video, may be appealing to many people. The video summarization should provide nearly the same level of the excitement (e.g. interest) that the original game provided.

It is possible to develop highly sophisticated models of a typical baseball video to identify potentially relevant portions of the video. However, such highly sophisticated models are difficult to create and are not normally robust. Further, the likelihood that a majority of the highly relevant portions of the baseball video will be included in such a video summarization is low because of the selectivity of the model. Thus the resulting video summarization of the baseball game may simply be unsatisfactory to the average viewer.

Football

A typical football game lasts about 3 hours of which only about one hour turns out to include time during which the ball is in action. The time during which the ball is in action is normally the exciting part of the game, such as for example, a kickoff, a hike, a pass play, a running play, a punt return, a punt, a field goal, etc. The remaining time during the football game is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, etc. While it may indeed be entertaining to sit in a stadium for three hours for a one hour football game, many people who watch a video of a football game find it difficult to watch all of the game, even if they are loyal fans. A video summarization of the football video, which provides a summary of the game having a duration shorter than the original football video, may be appealing to many people. The video summarization should provide nearly the same level of the excitement (e.g. interest) that the original game provided.

Upon initial consideration, football would not be a suitable candidate to attempt automated video summarization. Initially, there are nearly an endless number of potential plays that may occur which would need to be accounted for in some manner. Also, there are many different types of plays, such as a kickoff, a punt, a pass play, a kickoff return, a running play, a reverse play, an interception, a sack, etc., that likewise would need to be accounted for in some manner. In addition, each of these plays involves significant player motion which is difficult to anticipate, difficult to track, and is not consistent between plays. Moreover, the ball would normally be difficult, if not impossible, to track during a play because much of the time it is obscured from view. For example, it would be difficult to distinguish interesting play related activity from typical pre-play activity of the players walking around the field getting ready for the next play. Based upon such considerations has been previously considered impractical, if not impossible, to attempt to summarize football.

It is conceivably possible to develop highly sophisticated models of a typical football video to identify potentially relevant portions of the video. However, such highly sophisticated models are difficult to create and are not normally robust. Further, the likelihood that a majority of the highly relevant portions of the football video will be included in such a video summarization is low because of the selectivity of the model. Thus the resulting video summarization of the football game may simply be unsatisfactory to the average viewer.

Video Content Including Sports

It may be observed that many different types of video content, including for example sporting events, include a game or activity that lasts a significant period of time of which only a relatively short duration of which turns out to include time during which interesting activity is occurring. The time during which interesting action is occurring is normally the exciting part of the game, such as for example, a kickoff, a hike, a pass play, a running play, a punt return, a punt, a field goal, etc. The remaining time during the video content is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, inter-bout changes of players, pre-bout exercises and ceremonies, post-bout ceremonies, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to watch for several hours for a one hour activity, many people who watch a video of a sporting event find it difficult to watch all of the event, even if they are loyal fans. A video summarization of the video, such as sporting videos, which provides a summary of the event having a duration shorter than the original video, may be appealing to many people. The video summarization should provide nearly the same level of the excitement (e.g. interest) that the original game provided.

As previously discussed, upon initial consideration, sporting events would not be a suitable candidate to attempt automated video summarization. Initially, there are nearly an endless number of potential plays that may occur which would need to be accounted for in some manner. Also, there are many different types of plays, that likewise would need to be accounted for in some manner. In addition, each of these plays involves significant player motion which is difficult to anticipate, difficult to track, and is not consistent between plays. Moreover, any balls or other items would normally be difficult, if not impossible, to track during a play because much of the time it is obscured from view. For example, it would be difficult to distinguish interesting play related activity from typical pre-play activity of the participants walking around getting ready for the next play. Based upon such considerations has been previously considered impractical, if not impossible, to attempt to summarize sporting events.

It is conceivably possible to develop highly sophisticated models of a typical activity to identify potentially relevant portions of the video. However, such highly sophisticated models are difficult to create and are not normally robust. Further, the likelihood that a majority of the highly relevant portions of the video will be included in such a video summarization is low because of the selectivity of the model. Thus the resulting video summarization of the event may simply be unsatisfactory to the average viewer.

Play Selection

After consideration of the difficulty of developing highly sophisticated models of a video to analyze the content of the video, as the sole basis upon which to create a summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments in terms of understanding, following, or even appreciating the game is limited. These important portions occur semi-periodically and sparsely during the game, but they contain the moments of intense action and are the essence of a game. The remaining time is typically less important. Therefore preferably the events are selected based upon a "play". A "play" may be defined as a sequence of events defined by the rules of the event. In particular, and in one aspect, the sequence of events of a "play" may generally include the time between which the players set up to start an activity and the time during which the activity is completed. A play may also selectively include certain pre-activity ceremonies or events. Normally the "play" should include a related series of activities that could potentially result in a victory by one contestant and a loss by the other contestant.

It is to be understood that the temporal bounds of a particular type of "play" does not necessarily start or end at a particular instance, but rather at a time generally coincident with the start and end of the play or otherwise based upon, at least in part, a time (e.g., event) based upon a play. A summarization of the video is created by including a plurality of video segments, where the summarization includes fewer frames than the original video from which the summarization was created. A summarization that includes a plurality of the plays of the event provides the viewer with a shorted video sequence while permitting the viewer to still enjoy the event because most of the exciting portions of the video are provided, preferably in the same temporally sequential manner as in the original video. In addition, it is to be understood that although summarization often achieves compression at the same time, it is different from video coding which aims at representing the original video with less data. In fact, summarization may be considered more concerned about the compact representation of the "content" in the video, whereas video coding is more concerned about representing the video signal itself as accurately and as bandwidth-efficient as possible.

Play Detection

Referring to FIG. 1, a model of a class of sports video in terms of play is shown. The play portion is a basic segment of time during which an important action occurs in the game. The non-play is a segment of time during which a non-important action occurs in the game, or otherwise not determined to be a play. The inner loop illustrated in dashed lines indicates the possibility that two plays may occur consecutively or with a relatively short time period between the two plays.

Figure 2:
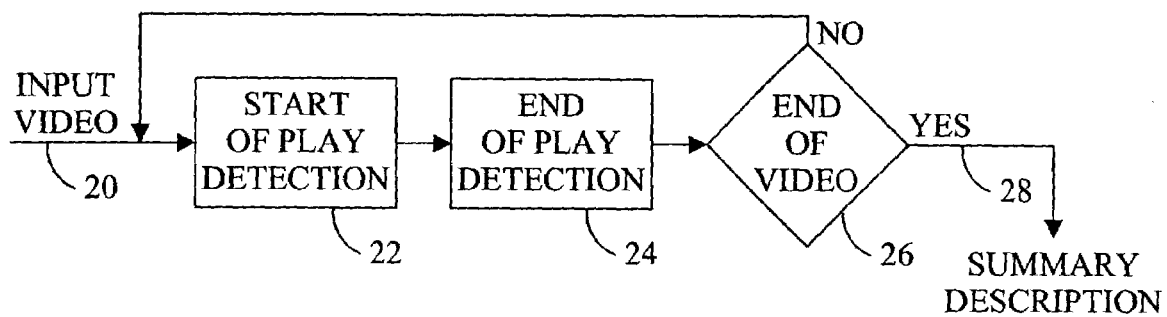
FIG. 2 is an exemplary flowchart for play detection.
Figure 3:
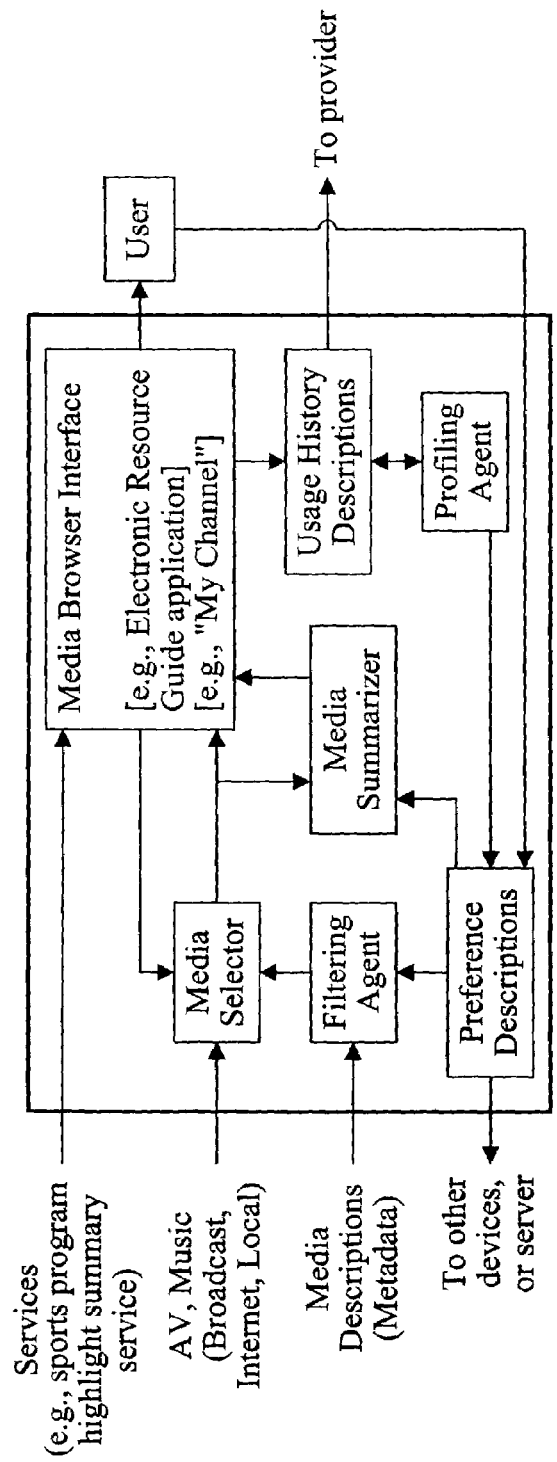
FIG. 3 is an exemplary MPEG7 compliant browser.

Referring to FIG. 2, a procedure for summarization of a video includes receiving a video sequence 20 that includes material to be summarized, where the content preferably includes at least a portion of a game or sporting event. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser, such as shown in FIG. 3, may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

Figure 4:
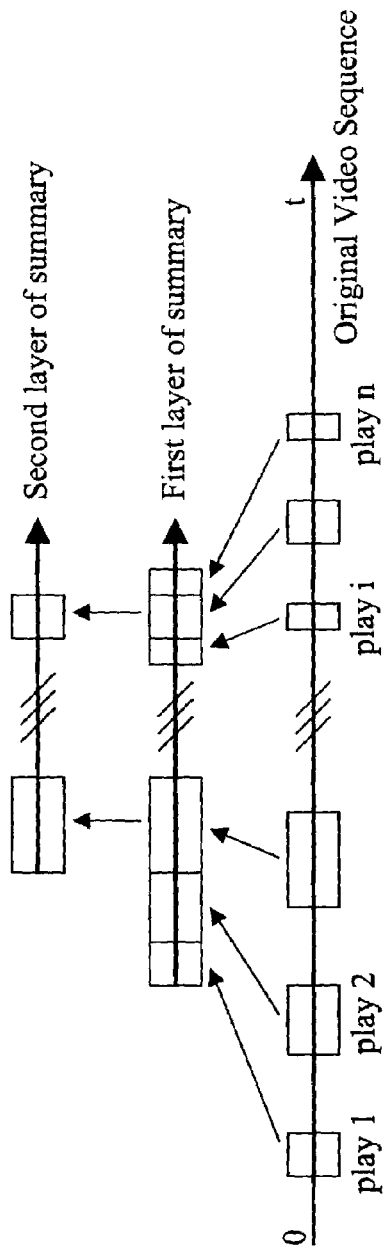
FIG. 4 illustrates hierarchical summaries.
Figure 5A:
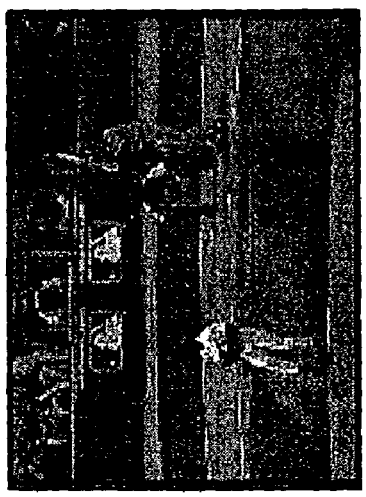
FIGS. 5A–5F illustrates the start of a baseball play.
Figure 5B:
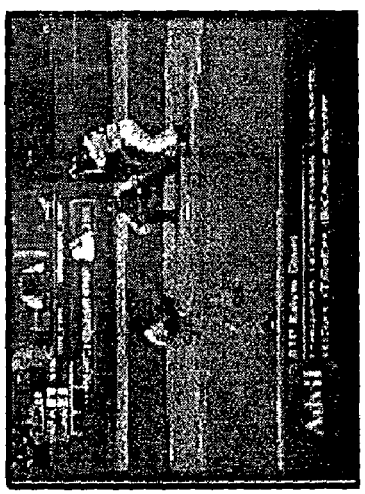
Figure 5C:
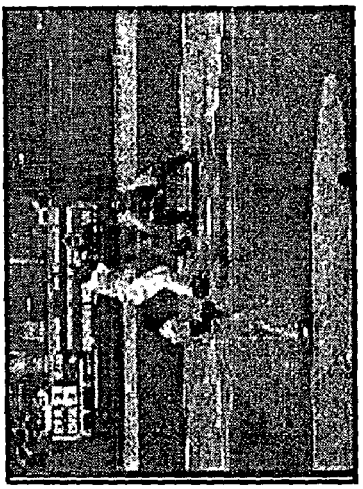
Figure 5D:
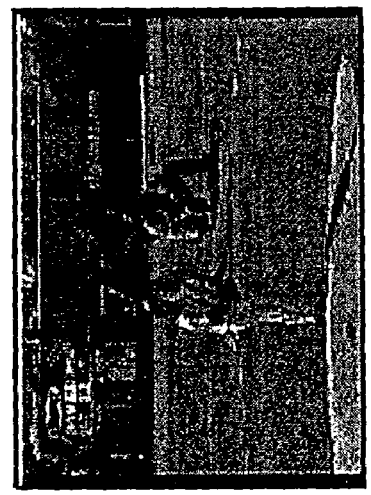
Figure 5E:
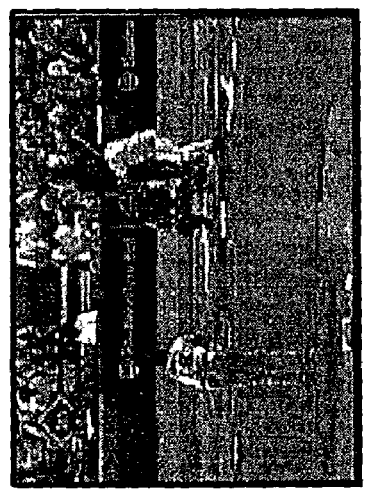
Figure 5F:
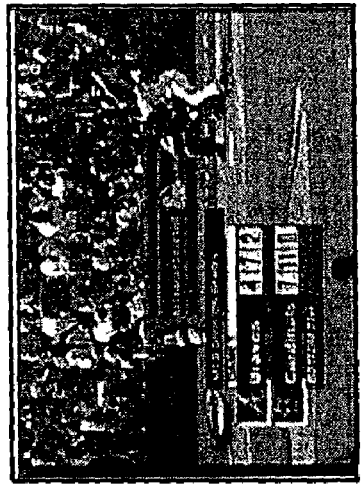

FIG. 2 is intended to show a basic procedure for obtaining such a summary, where the summary description contains only the start and end points of the detected plays. The summarization shown in FIG. 2 is primarily a low-level one, though in more complex situations it may contain other information, i.e. names of contestants etc. The benefit of a low-level summary is that it provides sufficient detail for people to appreciate a game from the summary. The low-level summary may then form the basis for a higher level summarization, if desired, as shown in FIG. 4. As one example, a higher level summary can be obtained by keeping only those plays receiving loud audience acclaims, achieved by adding an audio analysis procedure. Alternatively, in combination with a caption detection/recognition module, a summary can be obtained of only those plays containing a specific contestant. A yet higher summary level may contain only key frames from the plays for indexing purposes.

One component of the summarization procedure depicted in FIGS. 1 and 2 is the detection of an event, or "play." If the start and end points of all plays are detected, then the system may string all the plays together to obtain a summary from the original video and perform some post processing to smooth the transition boundaries, such as using dissolving techniques to reduce abrupt change between plays and smoothing the audio filed for better auditory effects. Further, the summary should ideally contain only those segments comprising a "play" as earlier defined, thus providing a compact representation of the original tournament. With a compact representation the user can spend less time watching it while maintaining most of the excitement of the original game.

One of the difficulties in the detection of a "play" in a sporting broadcast is the detection of the events. However, the present inventors have come to the realization that for sporting broadcasts, and other broadcasts, the general video capturing and production patterns that have been adopted by virtually all of the broadcast companies permits the detection of the events. Hence, relatively low-level visual features may be used for event detection that are relatively invariant.

With the summarization being determined based upon low-level characteristics of the video, the system should detect an event (e.g., a play). In contrast to a generic summarization scheme which uses for example color histograms as the cue for key frame detection or scene classification, the different plays may contain colors which sweep a large range of color (in terms of histogram), yet all the frames belong to the same event, and may be used to form an uninterrupted video clip.

Baseball Play Detection

The present inventors then considered how to detect a "play" from a baseball video in a robust, efficient, and computationally effective manner. After extensive analysis of a typical baseball game it was determined that a baseball game is usually captured by cameras positioned at fixed locations around the baseball field, with each camera typically capable of panning, tilting, and zooming. Each play in a baseball game normally starts with the pitcher releasing the ball, such as toward the catcher or toward one of the basemen. Further, a pitching scene, in which the pitcher is about to throw the ball, is usually captured from a camera location behind the pitcher. This camera angle is typically used because it is easier to observe the movements of all of the parties involved (the pitcher, the batter, the catcher, and the umpire) from this viewpoint. Thus a play typically starts with a frame such as shown in FIGS. 5A–5F.

While an attempt to determine a pitching scene may include complex computationally intensive analysis of the frame(s) to detect the pitcher, the batter, the catcher, and the umpire, together with appropriate motion, this generally results in non-robust pitching scene detection. To overcome this limitation the present inventors were dumbfounded to recognize that the lower portion of a typical pitching frame includes at least one region of generally green colors (grass or artificial turf), and at least one region of generally brown colors (e.g., soil). Normally the lower portion of a typical pitching frame for different fields includes these colors because the pitching mound and batting region are soil, with the region in between being grass or artificial turf. In addition, a typical pitching frame includes two regions of generally brown and/or two regions of generally green. A frame with one region of each color is sufficient.

Also, the present inventors observed that a typical pitching frame includes at least three regions of different colors arranged in alternating dominant horizontally oriented bands. Further, these three or more different color regions are typically generally green and generally brown in color. It is to be understood that the colors may be different depending on the particular anticipated colors, and that all the colors may be different. Depending on the camera angle the pitching scene may have the generally green color at the bottom of the frame or may have the generally brown color at the bottom of the frame. The colors preferably alternate between generally green (or brown) and generally brown (or green). There may be regions of other colors in addition to the generally green and generally brown. Accordingly, the preferred criteria is that the colors should be dominant along the horizontal axis while alternating in the vertical direction for a lower portion of the frame. In addition, the lower portion of the frame may be defined as the lower 75% of the frame, the lower 66% of the frame, the lower 50% of the frame, or the lower 30% of the frame, if desired. It is to be understood that the regions may be arranged in other patterns, as desired. Also, it is to be understood that the location of these regions within the frame may be arranged at other portions of the frame, such as the middle third of the frame, the upper third of the frame, the lower third of the frame, the right half of the frame, the left half of the frame, the central region of the frame, etc. An alternative characterization may be identification of at least three regions of sufficient spatial coherence and sufficient horizontal extent.

Figure 6:
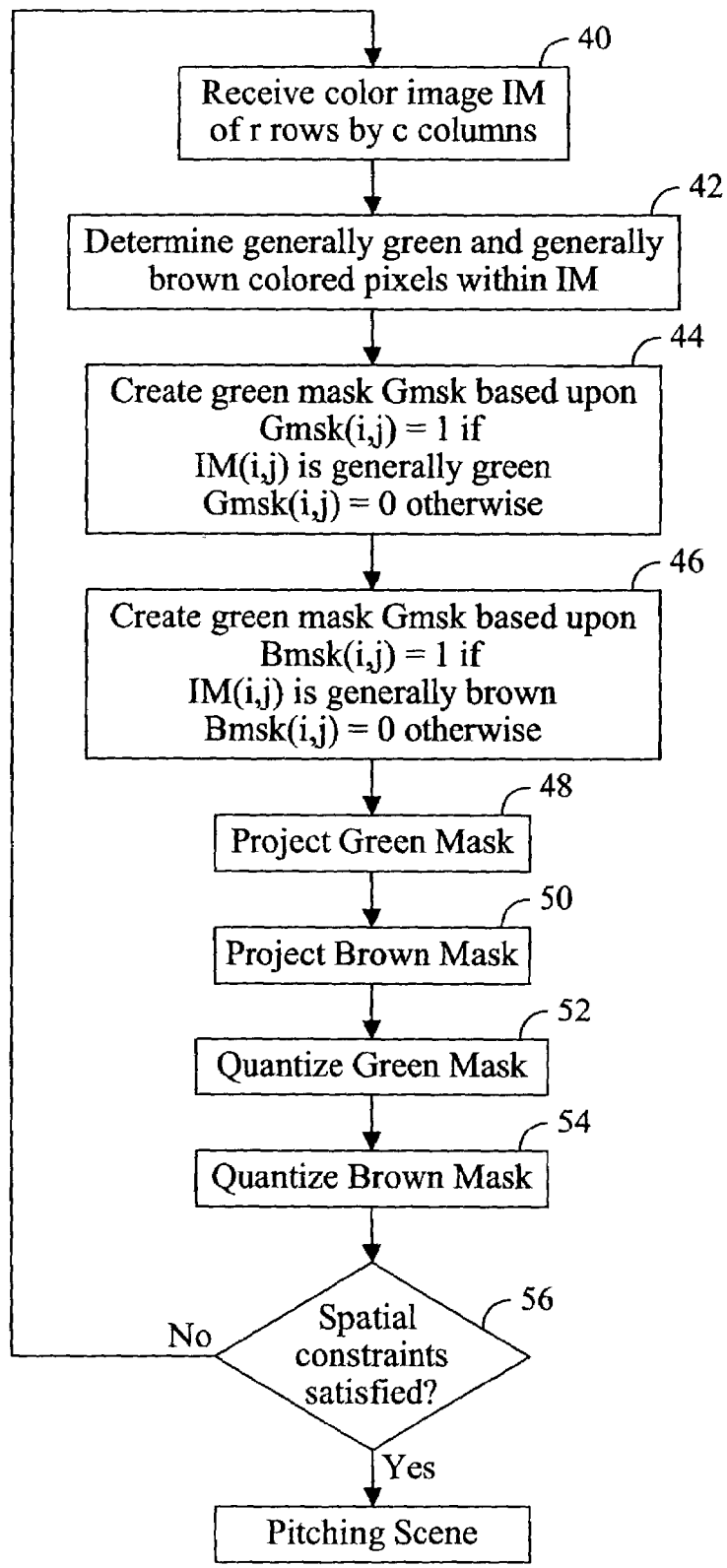
FIG. 6 illustrates one technique for play detection for baseball.

Referring to FIG. 6, based on these observations, the following technique may be used for detecting the pitching scene. Block 40 receives a color image IM of r rows by c columns. Block 42 determines the generally green and generally brown colored pixels within the color image IM. Block 44 creates a green mask Gmsk, with each location assigned a value based upon whether or not the corresponding pixel was generally green. In essence, the Gmsk identifies those pixels of the color image IM that are sufficiently green. Block 46 creates a brown mask Bmsk, with each location assigned a value based upon whether or not the corresponding pixel was generally brown. In essence, the Bmsk identifies those pixels of the color image IM that are sufficiently brown. The result of blocks 44 and 46 is to identify those regions of the color image IM that have colors of interest.

Block 48 projects the green mask Gmsk onto the vertical axis, such as in the manner of a histogram. The green projection may be calculated as Gproj(i)=

$$\frac{1}{c} \sum_j Gmsk(i, j) \text{ for } i = 1, \ldots, r.$$

The projection on the vertical axis Gproj(i) is suitable for identification of significant horizontal regions of the image that correlate to regions of the color image IM that are sufficiently green. Block 50 projects the brown mask Bmsk onto the vertical axis, such as in the manner of a histogram. The brown projection may be calculated as Bproj(i)=

$$\frac{1}{c} \sum_j Bmsk(i, j) \text{ for } i = 1, \ldots, r.$$

The projection on the vertical axis Bproj(i) is suitable for identification of significant horizontal regions of the image that correlate to regions of the color image IM that are sufficiently brown. The projection technique is used to identify those regions of sufficient spatial coherence and sufficient horizontal extent. It is to be understood that other techniques may likewise be used.

Block 52 quantizes (e.g., binarizes) the green projection. The quantized green projection may be calculated as Gproj(i)=1 if Gproj(i)>p1 and Gproj(i)=0 otherwise, where p1 is a threshold value (static or dynamic). Block 54 quantizes (e.g. binarizes) the brown projection. The quantized brown projection may be calculated as Bproj(i)=1 if Bproj(i)>p1 and Bproj(i)=0 otherwise, where p1 is a threshold value. The green and brown projections, and especially the binarized green and brown projections, are especially suitable for determining whether the peaks in Gproj and Bproj satisfy the spatial constraints of a pitching scene in block 56. In other words, the desired pattern of generally brown and generally green regions is determined within the frame. If the spatial constraints are satisfied then the frame is considered a pitching frame. If the spatial constrains are not satisfied then the frame is not considered a pitching frame. After extensive testing it has been determined that scenes other than a pitching scene is not likely to have the same constraints, and accordingly such a constraint will be relatively accurate at detecting pitching scenes.

Figure 7:
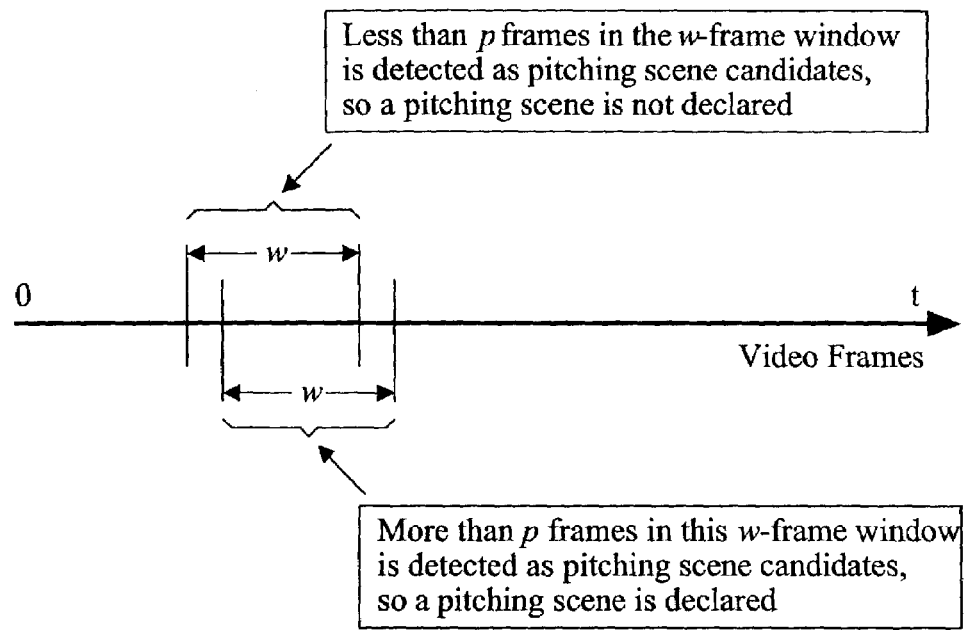
FIG. 7 illustrates a temporal frame validation technique.

After further consideration, the present inventors determined that if a pitching scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 7, the following approach may be used to achieve temporal evidence of accumulation: when detecting a pitching scene, a sliding window of width w is used (e.g., w frames are considered at the same time). A pitching scene is declared only if more than p out of the w frames in the current window are determined to be pitching scene candidates, as previously described. A suitable value of p is such that p/w=70%. Other statistical measures may be used of a fixed number of frames or dynamic number of frames to more accurately determine pitching scenes.

Figure 8:
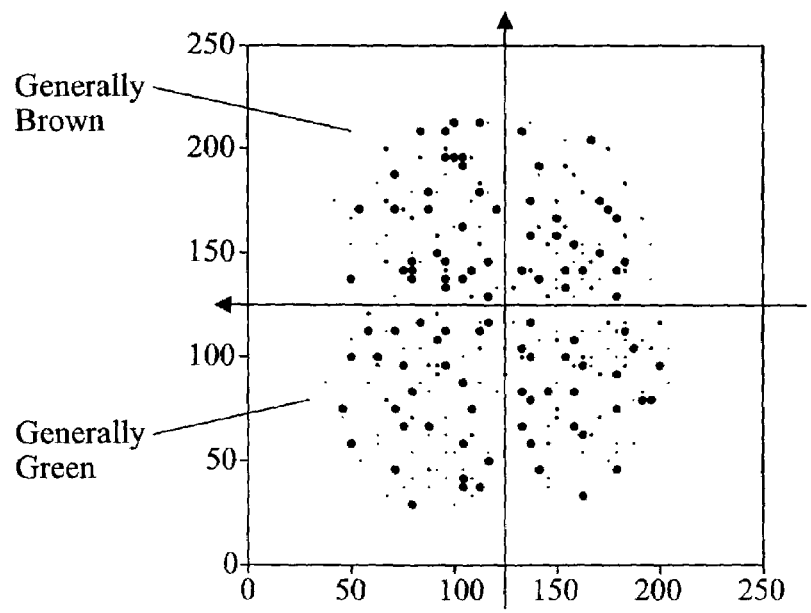
FIG. 8 illustrates color selection for plays.

To define the "generally green" color and the "generally brown" color any color space may be used. The preferred color space is the YUV color space because it may be used without excessive computational complexity. In the event that the input video is a MPEG stream, then the Y, U, V components are directly available after decoding, without further color space conversion. Also, a wide range of green and brown colors can be defined by the lower left quadrant and upper left quadrant of the U-V plane, respectively, as illustrated in FIG. 8. Thus, it is computationally efficient to determine the green and brown masks by comparing the U and V signals to a fixed value, such as 128.

While the start of a "play" may be defined as a pitching scene the end of a play, according to the rules of baseball, can end in a variety of different ways. For example, the play can end with the batter missing the ball, the play can end with a home run, the play can end if the ball is fouled away, the play can end with the batter being thrown out at first base, the play can end with the batter being thrown out at second base, and the play can end with the batter being ejected from the game. Image analysis techniques may be used to analyze the image content of the frames after a pitching frame to attempt to determine what occurred. Unfortunately, with the nearly endless possibilities and the difficultly of interpreting the content of the frames, this technique is at least, extremely difficult and computationally intensive. In contrast to attempting to analyze the content of the subsequent frames of a potential play, the present inventors determined that a more efficient manner for the determination of the extent of a play in baseball is to base the end of the play on camera activities. After analysis of a baseball video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 9:
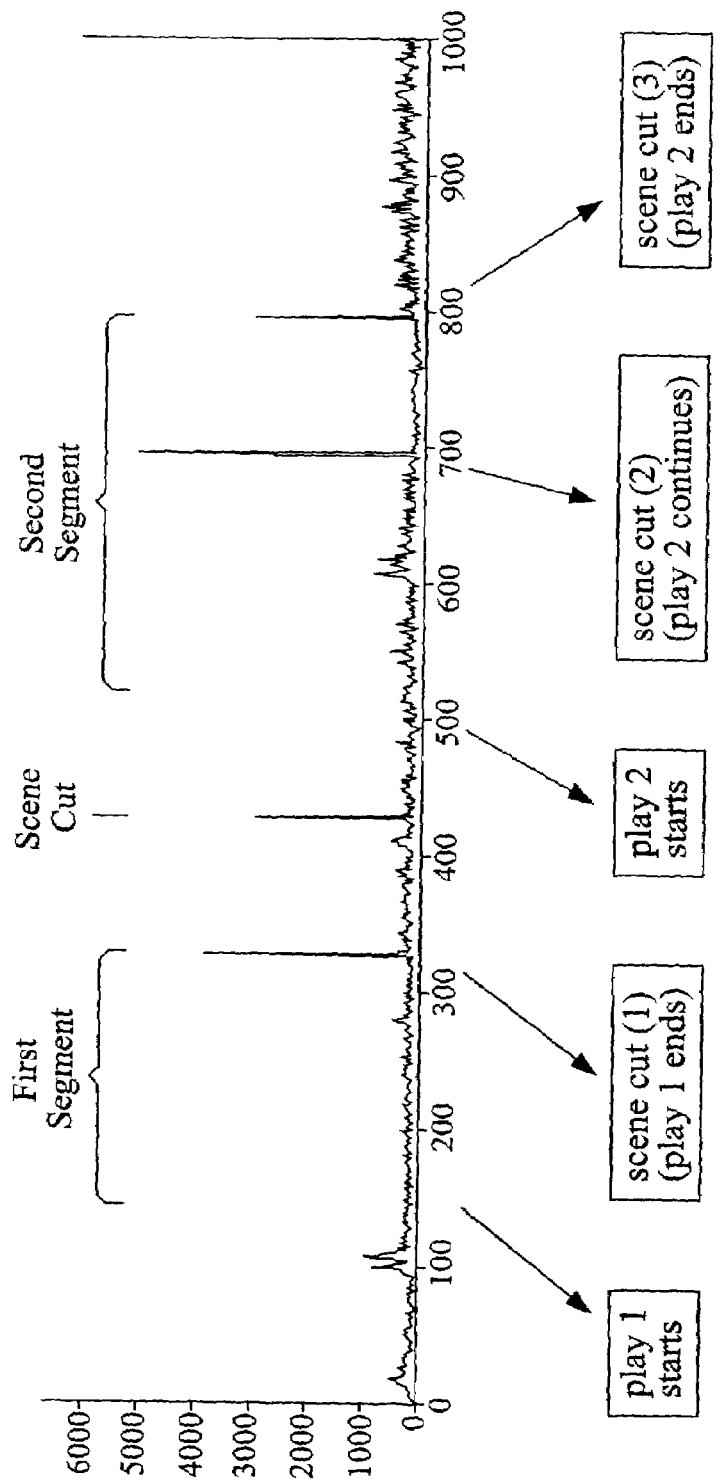
FIG. 9 illustrates the frame breaks between plays.
Figure 10:
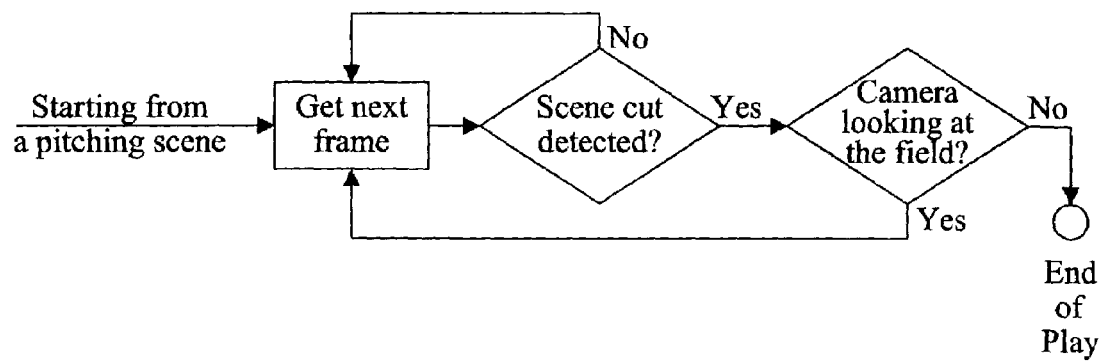
FIG. 10 is an exemplary flow chart for determining the end of a play.

Referring to FIG. 9, a model of the amount of change between frames using a color histogram difference technique for an exemplary 1,000 frame video baseball clip is shown. The peaks typically correspond to scene cuts. The system may detect a pitching scene at around frame 170. In this particular video clip the batter did not swing, and after the catcher caught the ball, there is a scene cut at frame 322. Accordingly, a first segment may be defined from frame 170 to frame 322. After the pitcher was ready for another throw, the camera was switched back resulting in a scene cut at frame 428. A new pitching scene was detected at frame 520. This time the batter hit the ball, and the camera was switched to follow the flying ball which resulted in scene cut 2. In this case, the play continues, until another scene cut (scene cut 3) when the current play ends and another camera break occurs. As it may be observed, the scene cut (1) properly identifies the end of the first segment in the first pitching scene, while the scene cut (2) does not properly identify the end of the second segment in the second pitching scene. Accordingly, for a more accurate representation of the play it is desirable to distinguish between scene cuts where the play continues and scene cuts where the play ends or has ended. To make this determination, the present inventors determined that most scene cuts where the play continues occurs when the camera is still looking primarily at the field. In this case, the play should continue until a scene cut occurs where the camera is not looking at the field. If after the scene cut the camera is not looking at the field, then the current play ends. The field may be detected in any manner, such as the frame having sufficient generally green or generally brown colors. A flow chart of the technique for detecting the end of a play is shown in FIG. 10.

As previously noted the scene cuts may be detected by thresholding the color histogram differences. The selection of the an appropriate threshold level to determine scene cuts may be based on a fixed threshold, if desired. The appropriate threshold level may be calculated for each baseball video, either after processing a segment of the video or otherwise dynamically while processing the video. One measure of the threshold level may be based upon the mean m and the standard deviation $\sigma$ of the frame-to-frame color histogram differences from the whole video. The threshold can be calculated as $m+c\sigma$ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

Although most plays start with a pitching scene illustrated in FIG. 5, one of the potential plays in baseball starts with a different camera angle, namely, the one for base-stealing. Typically the base stealing camera is directed toward first base (though second and third base are likewise possible). The detection technique may be used to likewise readily detect base stealing frames as the start of a play. In this case the colors tend to be a region of generally brown for the mound, generally green for the field, and generally brown for the field. However, the size of the brown regions are significantly different, which may be used as a basis to characterize the field. Also, the regions tend to encompass the entire frame (or majority).

While very loose color definitions for the colors is permitted, it is possible to calibrate the colors for a specific game. Calibrated colors permits more accurate play detection for a particular video. The calibration may be performed by a human operator or by the system with the assistance of a human operator. The system may perform automatic calibration by using appropriate statistical techniques. A simple technique is as follows. If the system has obtained a set of pitching scene candidates, the system can estimate the color histograms for green and brown colors, respectively, from these candidates. Under the assumption that most of the candidates are true pitching scene frames, the system can detect statistical outliers in this set. The system then uses the remaining candidate frames to estimate the specifics of the colors. With the green and brown colors calibrated, the system can perform both the start-of-play detection and the end-of-play detection more accurately.

At times the pitcher is ready to pitch but the batter is sometimes not yet in position and it takes the batter considerable time to get into position. In this case, the resulting play and thus the summary will contain significant time during which the batter is getting ready. To further refine the start of the play, a batter position module may be used. The module detects whether there are multiple sufficient gaps in the highest green region, and preferably whether the gaps shift with time. The gaps are readily observable in the green mask. If more than two sufficient gaps exist or the gaps shift with time, then the batter is typically not ready. Otherwise the batter is ready.

Sporting Event Detection

It may be observed different sporting activities typically have different scenes that indicate the start of a "play". However, if the scenes that indicate the start of a "play" are captured by a fixed camera angle, or otherwise a camera angle that provides an identifiable set of generally invariant characteristics of a scene, then the system may more readily identify the start of a play. It may likewise be observed that the end of the "play" may be characterized by a scene transition. In fact for a particular class of sporting events, the use of a fixed camera angle is normally done, since only one (or a few) camera angle(s) are suitable for capturing the action of all the parties involved. Moreover, professional video production normally includes a camera break (resulting in a scene transition) after an event has finished.

As previously discussed, a play may be characterized by low-level features such as the field colors and their spatial patterns, scene-cuts, etc., however, there may exist uncertainties and inaccuracies in extracting these features. Thus a higher level inference model should be used to make the final decision based on the low-level features. A deterministic technique for the inference is used to establish a set of rules for a specific sporting activity, such as sumo, football, or baseball. For example, in football and baseball, a suitable start scene should not have much camera motion. Also, to compensate for the possible miss in detecting the end of the play (possibly due to failure to detect the scene transition), one may put a constraint on the length of a play so that the play will not run too long. The length limit may be, for example, 30 second in a football game. In general, these rules may be established according to the specific game.

While a deterministic approach may be used it may be difficult to specify a set of rules for the inference. Another approach that is useful when the deterministic inference approach is unsuitable, is a probabilistic inference that is capable of learning. Probabilistic techniques have the advantage of avoiding the necessity of selecting hard thresholds that are required in a deterministic approach.

Assuming that shot segments are obtained by detecting a start scene and a scene transition, one may use different probabilistic inference techniques such as Bayesian networks (BN). Another probabilistic inference technique is using a Hidden Markov Model (HMM). Yet another probabilistic inference technique is a graphical model graphical model that unifies BN and HMM, as described by F. R. Kschischang, B. J. Frey, H- A. Loeliger, "Factor Graphs and the Sum-Product Algorithm", IEEE Trans. on Information Theory, Vol. 47, pp.498–519, 2001; and P. Smyth, "Belief Networks, Hidden Markov Models, and Markov Random Fields: A Unifying View", Pattern Recognition Letters, Vol. 18, pp.1261–1268, 1997.

Figure 11:
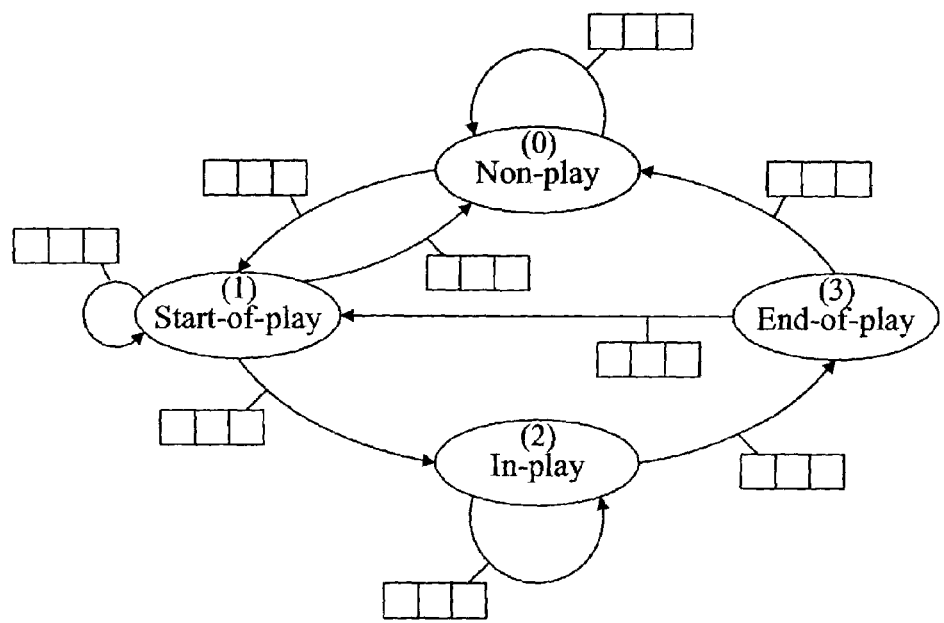
FIG. 11 illustrates a four-state HMM model for modeling a class of sports.

The first technique of using HMM for inference assumes that the segments have already been detected, and that each segment is generated with probability by certain underlying state. For example, a four-state HMM shown in FIG. 11, where arrowed lines indicate possible transitions between the states. Training sequences of segments with pre-specified play/non-play segmentation may be used to estimate the model parameters. To detect plays in an input video, one first obtains a sequence of shots using a non-interference technique as previously discussed or by manual selection. Then the most likely sequence of states may be found by using a suitable algorithm, such as the Viterbi algorithm. Plays are detected by identifying sequences of states "1-2-3".

The aforementioned approach still relies on a detection stage to obtain the shots, and then uses a HMM-based module to do the inference. Another technique of using the HMM, which simultaneously addresses both shot-detection and high-level inference, is more suitable. The system may still use the four-state model in FIG. 11, assuming that each arc is associated with an observation vector. The technique works as follows. For parameter estimation, a feature vector is computed for each frame in training sequences. Each frame in the training sequences is labeled with one of the four states. Parameter estimation for the HMM may be done using a Baum-Welch algorithm, such as disclosed by L. R. Rabiner, "A Tutorial on Hidden Markov Models and Selected Applications in Speech Recognition", Proc. Of the IEEE, Vol.77, No. 2, pp.257–285, 1989. With the ground truth (state labeling) for each frame given, the system may compute an initial model from the training sequences, instead of using a random or ad hoc hand-picked initial model, as follows:

$$\begin{bmatrix} \pi_i^{(0)} = \text{expected frequency in state } S_i \text{ at time } t = 1 \\ \bar{a}_{ij}^{(0)} = \dfrac{\text{expected \# of transitions from state } S_i \text{ to state } S_j}{\text{expected number of transitions from state } S_i} \\ \bar{b}_{ij}^{(0)}(k) = \dfrac{\text{expected \# of transitions from state } i \text{ to } j \text{ and observing symbol } V_k}{\text{expected number of transitions from state } i \text{ to } j} \end{bmatrix}$$

where $\{a_{ij}\},\{b_{ij}(k)\}$, and $\{p_i\}$ are the transition, emission, and initial state probabilities of the HMM, respectively. This initial estimate assists the Baum-Welch algorithm converging to a better critical point than using a random or ad hoc initialization. To detect plays in an input video using the trained model, the same feature vector may be computed for each frame, and the Viterbi algorithm is then applied to find the most likely sequence of states. A sequence of "1s-2s-3" signifies a play.

To increase success, the above integrated approach needs a good choice of features that constitute the observation $V_k$, since both training and testing heavily depend on the observation probability $P(V_k|T,\Lambda)$ (the probability of an observation given an HMM $\Lambda$ and state transition T).

The summary obtained by above procedures contains only play segments from the original video. In some situations, it may be helpful if the system also detects and includes those pre-play frames which contains information regarding the following play (e.g., graphical information such as the players' names, etc).

If desired, a slow motion replay detection module may be incorporated. The system detects if a slow motion replay has occurred, which normally relates to important events. The system will capture the replays of plays, the same as the typical non-slow motion replay (full speed), if the same type of camera angles are used. The play segments detected may be identified with multiple characteristics, namely, slow motion replay-only segments, play only segments without slow motion replay segments, and slow motion replay that include associated full speed segments. The resulting summary may include one or more of the different selections of the aforementioned options, as desired. For example, the resulting summary may have the slow-motion replays removed. These options may likewise be user selectable.

While an effective summarization of a sports video may be based on the concept of the "play", sometimes the viewer may prefer an even shorter summarization with the most exciting plays included. One potential technique for the estimation of the excitement of a play is to perform statistical analysis on the segments to determine which durations are most likely to have the highest excitement. However, this technique will likely not provide sufficiently accurate results. Further, excitement tends to be a subjective measure that is hard to quantify. After further consideration the present inventors came to the realization that the audio provided together with the video provides a good indication of the excitement of the plays. For example, the volume of the response of the audience and/or the commentators provides a good indication of the excitement. The louder audience and/or commentator acclamations, the greater the degree of excitement.

Figure 12A:
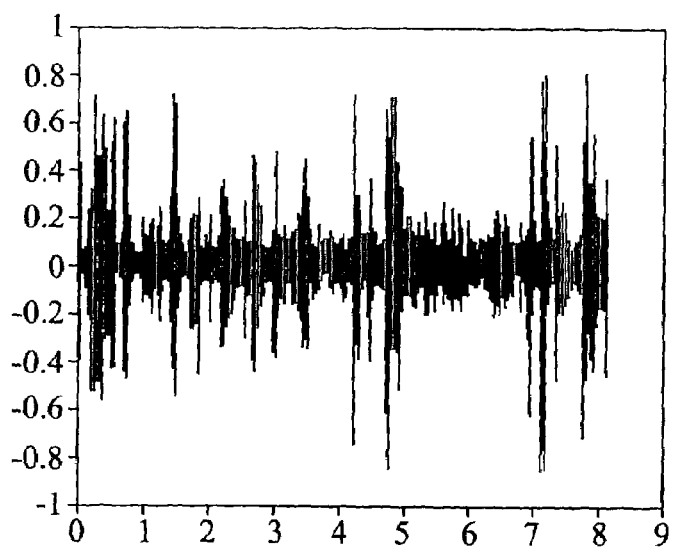
FIGS. 12A–12C illustrates different analysis of the audio for video.
Figure 12B:
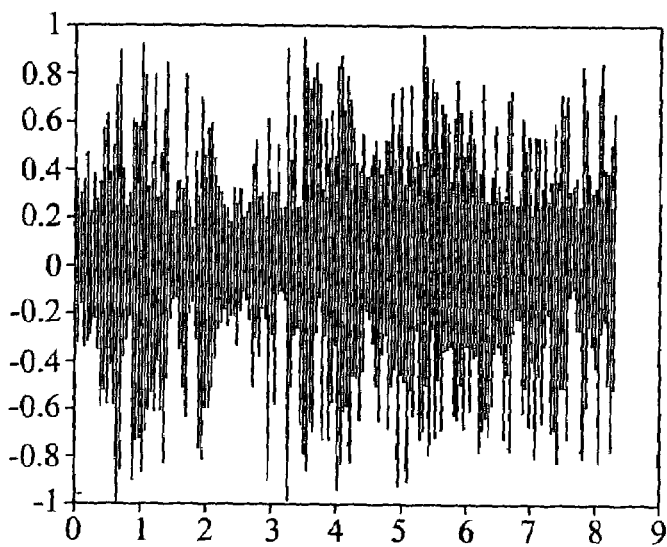
Figure 12C:
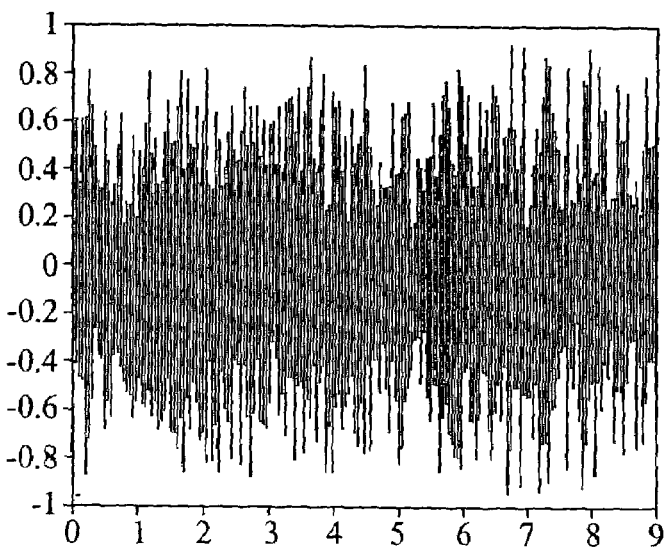

Referring to FIGS. 12A–12C, an exemplary illustration is shown of audio signals having a relatively quiet response (FIG. 12A), having a strong response (FIG. 12B), and having an extremely strong response (FIG. 12C). In general, it has been determined that more exciting plays have the following audio features. First, the mean audio volume of the play is large. The mean audio volume may be computed by defining the mean volume of a play as $$v = \frac{1}{N}\sum_{i=0}^{N-1} S^2(i)$$

where S(i) is the i-th sample, and the N is the total number of samples in the play. Second, the play contains more audio samples that have middle-ranged magnitudes. The second feature may be reflected by the percentage of the middle-range-magnituded samples in the play, which may be computed as $$P = \frac{1}{N}\sum_{i=0}^{N-1} I(\_s(i)\_ > t1\_s(i)\_ < t2)$$

with I(_s(i)_>t1 and _s(i)_<t2 being the indicator function (I(true)=1, and I(false)=0), t1 and t2 are two thresholds defining the middle range.

Figure 13:
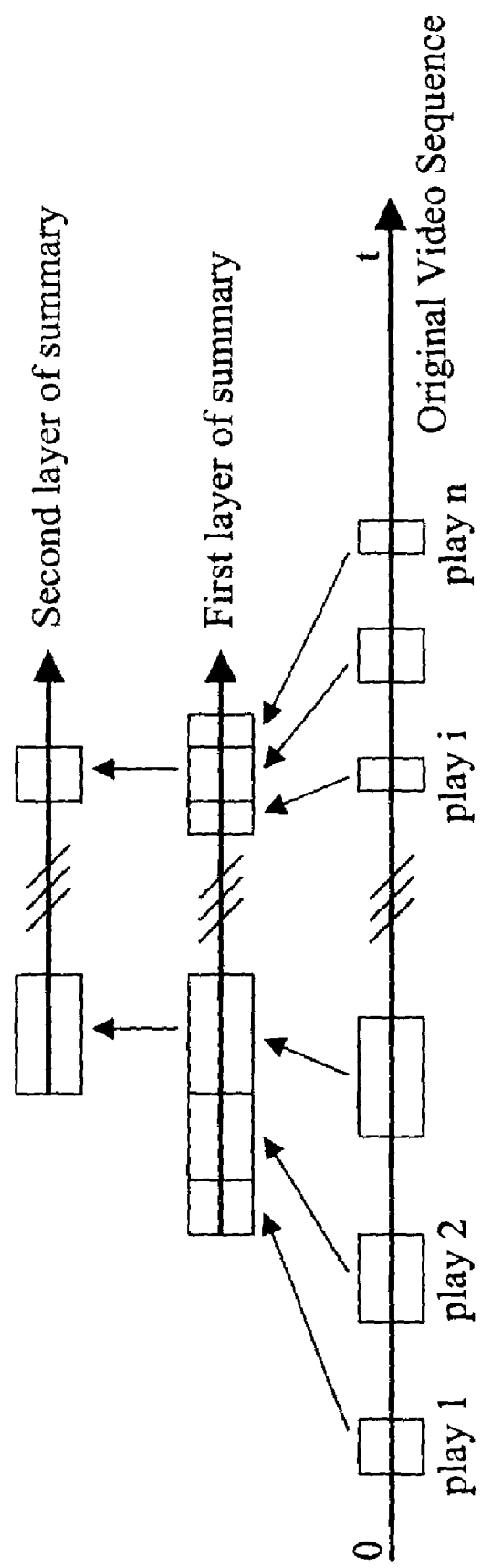
FIG. 13 illustrates hierarchical summaries for audio.

Referring to FIG. 13, the first layer of the summary is constructed using the play detection technique. The second and third layers (and other) are extracted as being of increasingly greater excitement, based at least in part, on the audio levels of the respective audio of the video segments. Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired. Moreover, the "shortened" summaries are easier to adapt to a mobile terminal or Internet applications where bandwidth inhibits a significant constraint.

Other higher level summaries may likewise be obtained based upon different criteria. For example, combined with a caption detection/recognition module, one may obtain a summary for those plays containing a specific player. Note that although higher-level summaries can be obtained from the result of the technique, the first layer of summary from the technique is the most complete one, compared with other possible variations.

As a constituent part of an MPEG-7 based media browser summarization is one of the key components. With different levels of summarization built on top of the detected events, the system may provide the user with varying levels of summaries according to their demands. Once the summary information is described as an MPEG-7 compliant XML document, the system may utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels. Note that the summarization may be performed at the server/service provider side. In that case, the user downloads/receives the summary description encoded in MPEG-7 format (i.e., an XML document). In this case, the summary may be enriched further by additional information that may be added by the service provider. Further, summarization may also be performed at the client side, in the absence of an available service, for example. In the latter case, summarization in a personal video recorder may offer a quick-view functionality.

If a service provider has the summarization functionality in its database, it can provide users with summaries in addition to the complete video. This enables a service provider to offer to the end user a new feature that is seemingly not available nowadays: the service provider can provide the user with summaries in for example, a pay-per-view basis. A service provider may also offer MPEG-7 compliant summary descriptions that are authored using the play data generated by the invention. A provider may also use the subject matter of the invention as a tool in analyzing indexing sports content to offer a play based search and retrieval service.

In addition to extracting more exciting plays, the audio analysis may also be used to extend the boundaries of the plays. For example, if a play is classified as exciting, then the system may extend one or more boundaries of the play by extending its start and/or end point. One straightforward technique for the extension to occur is to extend the end of the play by setting the end of the play to the next scene cut. It is noted that the audio analysis is preferably performed in the temporal domain, which is computationally efficient. Speech modeling and frequency domain analysis are computationally inefficient.

Referring again to FIG. 4, the video summarization may be included as part of an MPEG-7 based browser/filter, where summarization is included within the standard. With different levels of summarization built on top of the aforementioned video summarization technique, the system can provide the user with varying levels of summaries according to their demands. Once the summary information is described as an MPEG-7 compliant XML document, one can utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels.

In the case that the summarization is performed at a server or service provider, the user downloads and receives the summary description encoded in MPEG-7 format. Alternatively, in an interactive video on demand (VOD) application, the media and its summary description reside at the provider's VOD server and the user (e.g., remote) consumes the summary via a user-side browser interface. In this case, the summary may be enriched further by additional information that may be added by the service provider. Further, summarization may also be performed by the client.

Figure 14:
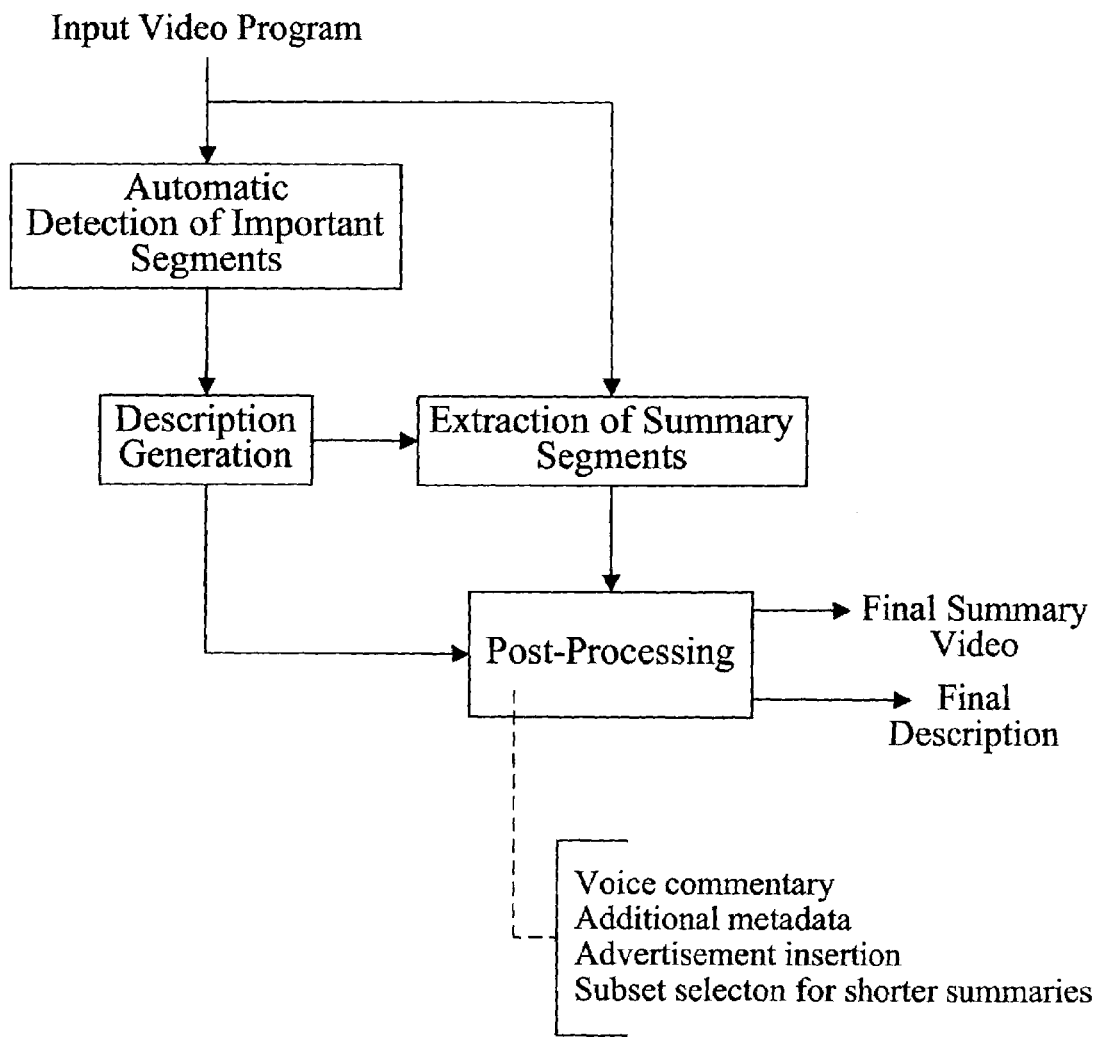
FIG. 14 illustrates an exemplary processing of video.

Referring to FIG. 14, the output of the module that automatically detects important segments may be a set of indices of segments containing plays and important parts of the input video program. A description document, such as an MPEG-7 or TV-Anytime compliant description is generated in The Description Generation module. Summary segments are made available to the Post-Processing module by The Extraction of Summary Segments module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g., binarized if it is generated originally in textual format such as XML. Post-processing may include adding to the original audio track a commentary, insertion of advertisement segments, or metadata. In contrast to play detection, post-processing may be completely, or in part, manual processing. It may include, for example, automatic ranking and subset selection of events on the basis of automatic detection of features in the audio track associated with video segments. This processing may be performed at the server and then the resulting video transferred to the client, normally over a network. Alternatively, the resulting video is included in a VOD library and made available to users on a VOD server.

Figure 15:
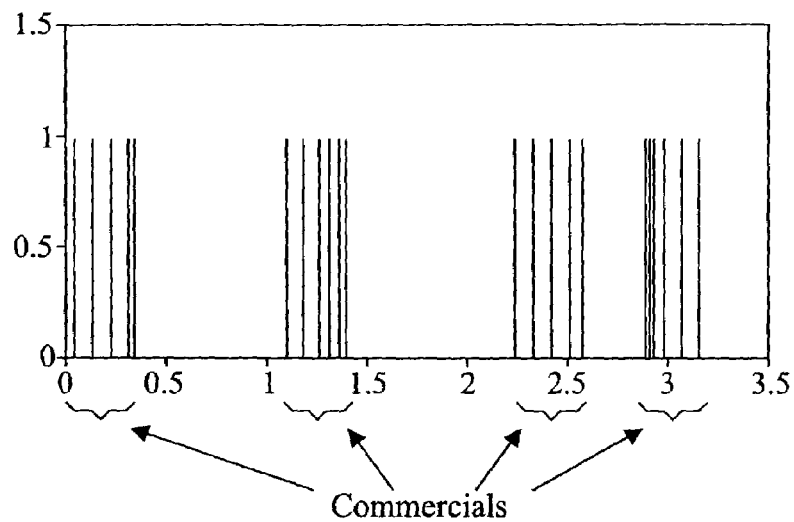
FIG. 15 illustrates the detection of black frames for commercials.
Figure 16:
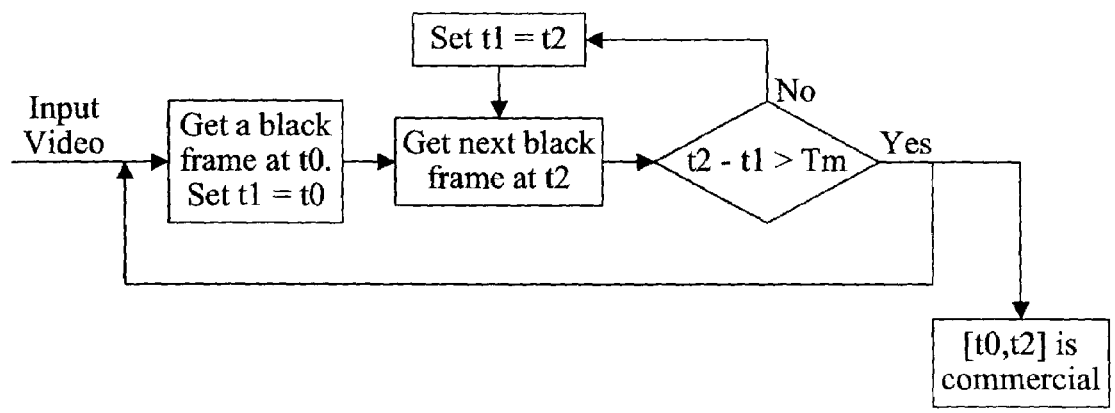
FIG. 16 illustrates an exemplary technique for segment removal based upon commercial information.

A commercial detection module may be used to further refine the potential play segments by removing those segments that are contained within commercials. In the broadcast industry, one or more black frames are inserted into the program to separate different commercials in the same commercial session. Referring to FIG. 15, an example of the distribution of black frames in a video of 35,000 frames, where a line shows the location of a black frame. Visually, it becomes apparent that the clusters of black frames are commercials. One technique for the detection of clusters, is shown in FIG. 16. The algorithm presumes that a regular program session will last at least Tm minutes. For example, Tm is typically larger than three minutes. On the other hand, it is unlikely that a single commercial will last more than two minutes. Thus, as long as black frames are used to separate different commercials in a commercial session, the preferred system will operate properly. By setting Tm reasonably large (e.g., three minutes), the system can still detect commercials even if not all the commercials in a commercial session are separated by black frames. Also, a reasonably large Tm will reduce the likelihood that the regular program is misclassified as a commercial. In addition, if one of the segments of the video is sufficiently temporally close to the commercial, they may be removed from the summarization.

Figure 17:
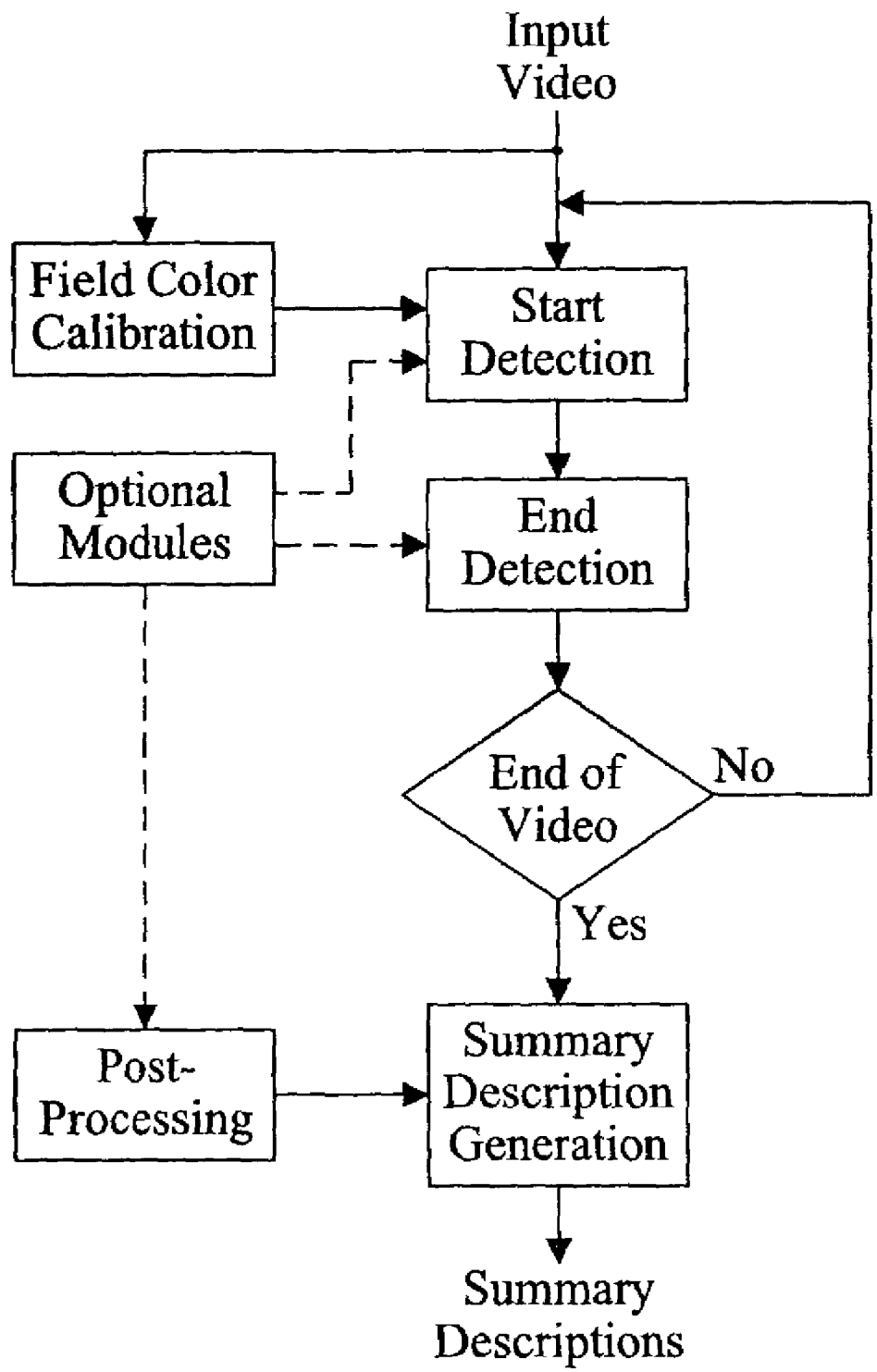
FIG. 17 illustrates an exemplary overall structure of the sports summarization system.

Referring to FIG. 17, a system may be developed that incorporates start detection of a play, end detection of a play, and summarization. The detection technique may be based upon processing a single frame, multiple frames, or a combination thereof.

All references cited herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of processing a video including sports comprising:
   (a) identifying a plurality of segments of said video based upon an event, wherein said event is determined automatically by a computer based upon a probabilistic inference technique, where each of said segments includes a plurality of frames of said video; and
   (b) creating a summarization of said video by including said plurality of segments, where said summarization includes fewer frames than said video.

2. The method of claim 1 wherein said probabilistic inference technique includes a Bayesian Network.

3. The method of claim 1 wherein said probabilistic inference technique includes a Hidden Markov Model.

4. The method of claim 1 wherein said probabilistic inference technique is applied to pre-identified segments.

5. The method of claim 1 wherein said probabilistic inference technique is free from being applied to pre-identified segments.

6. The method of claim 1 wherein said probabilistic inference technique uses training sequences of segments.

7. A method of processing a video including sports comprising:
   (a) identifying a plurality of segments of said video, where each of said segments is automatically identified by a computer includes a plurality of frames of said video, based upon a series of activities defined by the rules of said sports that could potentially result in at least one of:
      (i) a score;
      (ii) preventing a score; and
   (b) creating a summarization of said video by including said plurality of segments, where said summarization includes fewer frames than said video.

8. The method of claim 7 wherein said summarization of said plurality of segments is in the same temporal order as said plurality of segments within said video.

9. The method of claim 7 wherein said activities are determined based upon the color characteristics of said video.

10. The method of claim 7 wherein said activities are determined based upon scene changes.

11. A method of processing a video including sports comprising:
    (a) identifying a plurality of segments of said video based upon detecting a play of said sports, wherein said identifying includes a computer automatically detecting the start and end of said play, where each of said segments includes a plurality of frames of said video; and
    (b) creating a summarization of said video by including said plurality of segments, where said summarization includes fewer frames than said video.

12. The method of claim 11 wherein said detecting the end of said play is based upon detecting said start of said play.

13. The method of claim 11 wherein said summarization identifies said plurality of segments of said video.

14. The method of claim 11 wherein said summarization is a summarized video comprising said plurality of segments excluding at least a portion of said video other than said plurality of segments.

15. A method of processing a video including sports comprising:

(a) identifying a plurality of segments of said video, wherein the start of said plurality of segments is identified automatically by a computer based upon a frame of said video having color characteristics, where each of said segments includes a plurality of frames of said video; and (b) creating a summarization of said video by including said plurality of segments, where said summarization includes fewer frames than said video.

16. The method of claim 15 wherein said color characteristics are based on spatial regions having sufficient color homogeneity.

17. The method of claim 15 further comprising said color characteristics are based upon different spatially displaced regions having different colors.

18. A method of processing a video including sports comprising:

(a) identifying a plurality of segments of said video, wherein the start of said plurality of segments is identified automatically by a computer based upon anticipated characteristics of said plurality of segments from an anticipated camera angle used to obtain said start of said plurality of segments, where each of said segments includes a plurality of frames of said video; and (b) creating a summarization of said video by including said plurality of segments, where said summarization includes fewer frames than said video.

19. The method of claim 18 wherein said characteristics includes spatially displaced regions of predetermined characteristics.

20. The method of claim 18 wherein said characteristics includes predefined motion characteristics.

21. The method of claim 18 wherein the end of said plurality of segments is based upon a scene change.

22. A method of processing a video including sports comprising:

(a) identifying a plurality of segments of said video automatically by a computer wherein the start of said plurality of segments is based upon a play of said sports, where each of said segments includes a plurality of frames of said video;

(b) creating a first summarization of said video by including said plurality of segments, where said summarization includes fewer frames than said video; and (c) creating another summarization of said video from said plurality of segments, wherein said another summarization has a duration shorter than said first summarization.

23. The method of claim 22 wherein said another summarization is selected based upon audio information.

24. The method of claim 22 wherein said another summarization is selected based upon textual information.

25. The method of claim 22 further comprising creating a further summarization of said video from said plurality of segments, wherein said further summarization has a duration shorter than said another summarization.

26. A method of processing a video including sports comprising:

(a) identifying a plurality of segments of said video wherein the start of said plurality of segments is based upon a play of said sports, where each of said segments includes a plurality of frames of said video;

(b) creating a summary of said video from said plurality of segments, wherein said summary has a duration based upon the bandwidth requirements of the transmitting said summary to a user.

27. The method of claim 26 including transmitting to said user through a wireless connection.

28. The method of claim 26 including transmitting to said user through the Internet.

29. The method of claim 26 wherein said summary is based upon a user profile of said user.

30. A method of processing a video including sports comprising:

(a) identifying a plurality of segments of said video wherein the start of said plurality of segments is based upon a play of said sports, where each of said segments includes a plurality of frames of said video;

(b) creating a summary of said video from said plurality of segments, wherein said summary includes fewer frames than said sports video, wherein said plurality of segments were selected based upon a caption module of said sports video.

31. The method of claim 30 wherein said caption module detects captions within said video.

32. The method of claim 31 wherein said caption module recognizes information with said caption.

33. A method of processing a video including sports comprising:

(a) identifying a plurality of segments of said video automatically by a computer wherein said identifying for at least one of said segments includes detecting the start of said segment based upon processing of a first single frame of said video, where each of said segments includes a plurality of frames of said video;

(b) verifying that said first single frame is an appropriate start of said segment based upon processing of another single frame temporally relevant to said first single frame; and (c) creating a summarization of said video by including said plurality of segments, where said summarization includes fewer frames than said video.

34. A method of processing a video including sports comprising:

(a) identifying a plurality of segments of said sports video automatically by a computer, wherein said identifying for the end of at least one of said segments is based upon detecting a scene change, where each of said segments includes a plurality of frames of said sports video; and (b) creating a summarization of said sports video by including said plurality of segments, where said summarization includes fewer frames than said sports video.

35. The method of claim 34 wherein said scene change is based upon a threshold between at least two frames.

36. The method of claim 34 wherein said scene change is based upon a gradual transition below a threshold level.

37. A method of processing a video including sports comprising:

(a) identifying a plurality of segments of said video automatically by a computer, where each of said segments includes a plurality of frames of said video;

(b) identifying a plurality of segments, automatically by a computer, that are temporally separated by a sufficiently short duration;

(c) based upon said identifying as a result of (b) connecting said identified plurality of segments; and (d) creating a summarization of said video by including said plurality of segments, where said summarization includes fewer frames than said video.

38. The method of claim 37 wherein said connecting includes discarding the frames of said video between said identified plurality of segments.

39. The method of claim 37 wherein said connecting results in a single segment that includes said identified plurality of segments together with the frames of said video between said identified plurality of segments.

40. method of processing a video including sports comprising:
(a) identifying a plurality of segments of said video automatically by a computer, where each of said segments includes a plurality of frames of said video;
(b) identifying at least one of said segments, automatically by a computer, that has a temporally sufficiently short duration;
(c) based upon said identifying as a result of (b) removing said identified segment from said summarization; and
(d) creating a summarization of said video by including said plurality of segments, where said summarization includes fewer frames than said video.

41. The method of claim 40 wherein said connecting includes discarding the frames of said video between said identified plurality of segments.

42. The method of claim 40 wherein said connecting results in a single segment that includes said identified plurality of segments together with the frames of said video between said identified plurality of segments.

43. A method of processing a video including sports comprising:
(a) identifying a plurality of segments of said video automatically by a computer wherein each of said segments includes a play of said sports, wherein said segments include full-speed plays and slow motion plays of said full-speed plays; and
(b) creating a summarization of said video by including said plurality of segments, where said summarization includes fewer frames than said video, where a user may select from:
(i) said summarization including only full-speed plays;
(ii) said summarization including only slow motion plays;
(iii) said summarization including both full-speed plays and slow motion plays.

44. A method of processing a video including sports comprising:
(a) identifying a plurality of segments of said video automatically by a computer wherein each of said segments includes a play of said sports;
(b) creating a summarization of said video by including said plurality of segments, where said summarization includes fewer frames than said video; and
(c) removing at least one of said segments from said summary based, at least in part, upon audio information related to said at least one of said segments.

45. The method of claim 44 wherein said audio information is obtained exclusively from a temporal analysis.

46. A method of processing a video including sports comprising:
(a) identifying a plurality of segments of said video automatically by a computer wherein each of said segments includes a play of said sports;
(b) creating a summarization of said video by including said plurality of segments, where said summarization includes fewer frames than said video; and
(c) modifying the duration of at least one of said segments from said summary based, at least in part, upon audio information related to said at least one of said segments.

47. The method of claim 46 wherein said audio information is obtained exclusively from a temporal analysis.

48. A method of processing a video comprising:
(a) providing a description of said video;
(b) identifying a plurality of segments of said video automatically by a computer based upon said description;
(c) generating another video based upon said identified segments, wherein said another video has less frames than said video.

49. The method of claim 48 wherein said video is transcoded in accordance with the channel capacity of a transmission medium.

50. The method of claim 48 wherein said video is transcoded in accordance with the storage capacity of a storage device.

51. The method of claim 48 wherein said description is compliant with MPEG-7 standard.

52. The method of claim 48 wherein said description is compliant with TV-Anytime standard.

53. A method of processing a video including sports comprising:
(a) identifying a plurality of segments of said video wherein each of said segments includes a play of said sports;
(b) detecting a commercial within said video; and
(c) creating a summarization of said video by including said plurality of segments, where said summarization includes fewer frames than said video, where said plurality of segments of said video sufficiently temporally close to said commercial are free from being included within said summarization.

* * * * *

UNITED STATES PATENT AND TRADEMARK OFFICE
CERTIFICATE OF CORRECTION

PATENT NO. : 7,203,620 B2  Page 1 of 1
APPLICATION NO. : 10/155358
DATED : April 10, 2007
INVENTOR(S) : Baoxin Li It is certified that error appears in the above-identified patent and that said Letters Patent is hereby corrected as shown below:

Column 10, line 10
Change "constrains" to --constraints--.

Column 13, line 33
Change "graphical model graphical model" to --graphical model--.

Column 21, line 8 (Claim 40)
Change "method of" to --A method of--.

Signed and Sealed this

Seventeenth Day of June, 2008

JON W. DUDAS
*Director of the United States Patent and Trademark Office*